(12) United States Patent
Peach

(10) Patent No.: US 8,374,292 B2
(45) Date of Patent: *Feb. 12, 2013

(54) SYSTEM AND METHOD FOR DECODING AUTOMATIC IDENTIFICATION SYSTEM SIGNALS

(75) Inventor: Robert Peach, Cambridge (CA)

(73) Assignee: Com Dev International Ltd., Cambridge (CA)

( * ) Notice: Subject to any disclaimer, the term of this patent is extended or adjusted under 35 U.S.C. 154(b) by 103 days.

This patent is subject to a terminal disclaimer.

(21) Appl. No.: 12/915,699

(22) Filed: Oct. 29, 2010

(65) Prior Publication Data

US 2011/0268229 A1    Nov. 3, 2011

Related U.S. Application Data

(63) Continuation of application No. 11/760,358, filed on Jun. 8, 2007, now Pat. No. 7,876,865.

(51) Int. Cl.
*H03D 1/00* (2006.01)

(52) U.S. Cl. .................. 375/343; 375/150; 375/324

(58) Field of Classification Search .................. 375/150, 375/324, 343

See application file for complete search history.

(56) References Cited

U.S. PATENT DOCUMENTS

| 3,307,188 | A | 2/1967 | Marchetti |
|---|---|---|---|
| 3,825,928 | A | 7/1974 | Williams |
| 3,842,417 | A | 10/1974 | Williams |
| 4,023,170 | A | 5/1977 | Buss |
| 4,028,699 | A | 6/1977 | Stevens |
| 4,114,142 | A | 9/1978 | Wycoff et al. |
| 4,129,873 | A | 12/1978 | Kennedy |
| 4,276,551 | A | 6/1981 | Williams et al. |
| 4,359,733 | A | 11/1982 | O'Neill |
| 5,029,184 | A | 7/1991 | Andren et al. |
| 5,103,461 | A | 4/1992 | Tymes |
| 5,132,694 | A | 7/1992 | Sreenivas |
| 5,142,550 | A | 8/1992 | Tymes |
| 5,157,687 | A | 10/1992 | Tymes |

(Continued)

FOREIGN PATENT DOCUMENTS

| CA | 2653203 | 5/2007 |
|---|---|---|
| EP | 1202388 A2 | 5/2002 |

(Continued)

OTHER PUBLICATIONS

Extended European Search Report dated Apr. 11, 2011 for Application No. 10192812.5-2411.

(Continued)

*Primary Examiner* — Shuwang Liu
*Assistant Examiner* — David Huang
(74) *Attorney, Agent, or Firm* — Bereskin & Parr LLP; Isis E. Caulder

(57) ABSTRACT

Various embodiments are described herein for a system and method of detecting Automatic Identification System (AIS) signals in space and decoding these signals. In one aspect, a system for performing this function is described which includes a receiver configured to receive the plurality of AIS signals and pre-process the plurality of AIS signals to produce digital input data, and a processing unit configured to process the digital input data to identify one or more candidate AIS message signals based on Doppler offsets associated with the digital input data, determine corresponding Doppler offset estimates and time estimates of the one or more candidate AIS message signals, decode the one or more candidate AIS message signals to obtain corresponding message segments and validate the decoded message segments for proper AIS formatting.

18 Claims, 9 Drawing Sheets

U.S. PATENT DOCUMENTS

| | | | |
|---|---|---|---|
| 5,233,358 A | 8/1993 | Murphy | |
| 5,280,498 A | 1/1994 | Tymes et al. | |
| 5,359,521 A | 10/1994 | Kyrtsos et al. | |
| 5,375,059 A | 12/1994 | Kyrtsos et al. | |
| 5,379,448 A | 1/1995 | Ames et al. | |
| 5,390,125 A | 2/1995 | Sennott et al. | |
| 5,401,944 A | 3/1995 | Bravman et al. | |
| 5,420,809 A | 5/1995 | Read et al. | |
| 5,438,517 A | 8/1995 | Sennott et al. | |
| 5,442,558 A | 8/1995 | Kyrtsos et al. | |
| 5,479,441 A | 12/1995 | Tymes et al. | |
| 5,490,073 A | 2/1996 | Kyrtsos | |
| 5,506,587 A | 4/1996 | Lans | |
| 5,528,221 A | 6/1996 | Jeuch et al. | |
| 5,528,621 A | 6/1996 | Heiman et al. | |
| 5,550,743 A | 8/1996 | Kyrtsos | |
| 5,555,503 A | 9/1996 | Kyrtsos et al. | |
| 5,579,016 A | 11/1996 | Wolcott et al. | |
| 5,629,855 A | 5/1997 | Kyrtsos et al. | |
| 5,668,803 A | 9/1997 | Tymes et al. | |
| 5,706,313 A | 1/1998 | Blasiak et al. | |
| 5,754,139 A | 5/1998 | Turcotte et al. | |
| 5,815,811 A | 9/1998 | Pinard et al. | |
| 6,002,918 A | 12/1999 | Heiman et al. | |
| 6,011,512 A | 1/2000 | Cohen | |
| 6,044,323 A | 3/2000 | Yee et al. | |
| 6,104,978 A | 8/2000 | Harrison et al. | |
| 6,148,040 A | 11/2000 | Nguyen et al. | |
| 6,185,427 B1 | 2/2001 | Krasner et al. | |
| 6,236,354 B1 | 5/2001 | Krasner | |
| 6,298,242 B1 | 10/2001 | Schiff | |
| 6,314,269 B1 | 11/2001 | Hart et al. | |
| 6,370,126 B1 | 4/2002 | De Baere et al. | |
| 6,374,104 B1 | 4/2002 | Croq et al. | |
| 6,421,000 B1 | 7/2002 | McDowell | |
| 6,427,121 B2 | 7/2002 | Brodie | |
| 6,512,720 B1 | 1/2003 | Yang | |
| 6,522,301 B2 | 2/2003 | Takayama et al. | |
| 6,522,643 B1 | 2/2003 | Jacomb-Hood | |
| 6,611,757 B2 | 8/2003 | Brodie | |
| 6,658,349 B2 | 12/2003 | Cline | |
| 6,738,358 B2 | 5/2004 | Bist et al. | |
| 6,813,263 B1 | 11/2004 | Margherita | |
| 6,823,170 B1 | 11/2004 | Dent | |
| 7,047,114 B1 | 5/2006 | Rogers | |
| 7,205,933 B1 | 4/2007 | Snodgrass | |
| 7,265,713 B2 | 9/2007 | Lewis | |
| 7,317,916 B1 | 1/2008 | Chang et al. | |
| 7,526,249 B2 | 4/2009 | Waltman et al. | |
| 7,876,865 B2* | 1/2011 | Peach | 375/343 |
| 8,295,325 B2* | 10/2012 | Guey | 375/145 |
| 2002/0061073 A1 | 5/2002 | Huang et al. | |
| 2003/0017827 A1 | 1/2003 | Ciaburro et al. | |
| 2004/0039504 A1 | 2/2004 | Coffee et al. | |
| 2004/0166807 A1 | 8/2004 | Vesikivi et al. | |
| 2004/0174895 A1 | 9/2004 | Hiraoka et al. | |
| 2004/0183673 A1 | 9/2004 | Nageli | |
| 2004/0193367 A1 | 9/2004 | Cline | |
| 2004/0217900 A1 | 11/2004 | Martin et al. | |
| 2005/0124291 A1 | 6/2005 | Hart et al. | |
| 2005/0248486 A1 | 11/2005 | Lee et al. | |
| 2005/0271000 A1 | 12/2005 | Schulist | |
| 2006/0087456 A1 | 4/2006 | Luby | |
| 2006/0107192 A1 | 5/2006 | Mantha et al. | |
| 2006/0109106 A1 | 5/2006 | Braun | |
| 2006/0114862 A1 | 6/2006 | Hiraoka | |
| 2006/0129288 A1 | 6/2006 | Yanagi | |
| 2006/0199612 A1 | 9/2006 | Beyer, Jr. et al. | |
| 2006/0205370 A1 | 9/2006 | Hayashi et al. | |
| 2008/0086267 A1 | 4/2008 | Stolte et al. | |
| 2008/0088485 A1 | 4/2008 | Stolte et al. | |
| 2008/0220771 A1 | 9/2008 | Agarwal | |
| 2008/0304597 A1 | 12/2008 | Peach | |
| 2009/0161797 A1 | 6/2009 | Cowles et al. | |
| 2010/0061427 A1 | 3/2010 | Lopez-Risueno et al. | |
| 2011/0075602 A1 | 3/2011 | Peach et al. | |
| 2011/0304502 A1 | 12/2011 | Chen et al. | |

FOREIGN PATENT DOCUMENTS

| | | |
|---|---|---|
| EP | 2024754 | 5/2007 |
| JP | 2003109200 | 4/2003 |
| JP | 2005181078 | 7/2005 |
| WO | 0209318 A2 | 1/2002 |
| WO | 03046603 A1 | 6/2003 |
| WO | WO03/046603 | 6/2003 |
| WO | 2004010572 A1 | 1/2004 |
| WO | 2007143478 A2 | 12/2007 |
| WO | WO2007/143478 | 12/2007 |
| WO | 2008148188 | 12/2008 |
| WO | WO2008/148188 | 12/2008 |

OTHER PUBLICATIONS

United States Office Action, U.S. Appl. No. 11/760,358, dated Apr. 14, 2010.

United States Notice of Allowance, U.S. Appl. No. 11/760,358, dated Oct. 1, 2010.

Supplementary European Search Report, European Patent Application No. 08748111.5, dated May 26, 2010.

Ole Frederik Haakonsen Dahl: "Space-based AIS Receiver for Maritime Traffic Monitoring Using Interference Cancellation", Norwegian University of Science and Technology Master of science in Communication technology, Jun. 2006, pp. 1-107.

European Search Report/Written Opinion dated Aug. 12, 2009.

PCT International Search Report/Written Opinion mailed on Jul. 24, 2008.

Comments of the National Telecommunications and Information Administration before the Federal Communications Commission on Dec. 1, 2006.

Høye et al., "Space-based AIS for global maritime traffic monitoring", Acta Astronautica, available online Sep. 17, 2007, pp. 240-245, v. 62, Elsevier.

Satellite AIS from USCG, Digital Ship, Apr. 2007, p. 26.

Cairns, "AIS and Long Range Identification & Tracking", Journal of Navigation, paper presented on Nov. 9, 2004, pp. 181-189, v. 58, Royal Institute of Navigation.

Maritime Safety and Surveillance Initiative presentation dated Apr. 2005.

Molessa, "Satellite AIS for Long Range Identification & Tracking", seminar dated Nov. 3-5, 2004.

ITU Radio Communication Study Groups Document 8B/242-E dated Sep. 9, 2005.

Tetrault, "Use of AIS for Maritime Domain Awareness", presentation dated Oct. 17, 2005.

Wahl et al., "New possible roles of small satellites in maritime surveillance", Acta Astronautica, 2004, pp. 273-277, v. 59, Elsevier.

Eriksen et al., "Maritime traffic monitoring using a space-based AIS receiver", paper presented at 55th International Astronautical Congress 2004, Vancouver, Canada.

Høye et al., "Space-based AIS for global maritime traffic monitoring", pre-print from 5th IAA Symposium on Small Satellites for Earth Observation, Apr. 4-8, 2005, Berlin.

Meland et al., "Maritime services for large-area surveillance using a space-based AIS receiver", Feb. 21, 2005.

Cairns, "AIS and Long Range Identification & Tracking", abstract published online on Apr. 18, 2005.

Høye et al., "Space-based AIS for global maritime traffic monitoring", abstract available online Sep. 17, 2007.

Wahl et al., "New possible roles of small satellites in maritime surveillance", abstract available online Nov. 17, 2004.

Short Messaging System Application Concepts Study, dated Jun. 30, 2005.

FFI Facts—Space-based Surveillance, Apr. 2005.

"Watching the watchers: satellite to demonstrate maritime surveillance for coast guard", Entrepeneur.com, Jan. 2008.

"Coast Guard looks to space for maritime awareness", U.S. Coast Guard Press Release, Jan. 24, 2007.

"AIS Satellites for Global Ship Tracking", gCaptain.com, dated Aug. 7, 2007.

European Examination Report dated Mar. 8, 2011 and European Search Report dated Aug. 12, 2009 for Application No. 09 250 993.4-2411.

Notice of Abandonment dated Feb. 8, 2012, U.S. Appl. No. 12/360,473.
Office Action dated Jul. 18, 2011, U.S. Appl. No. 12/360,473.
Office Action dated May 30, 2012, U.S. Appl. No. 12/797,066.
Amendment dated Jul. 14, 2010, U.S. Appl. No. 11/760,358.
Preliminary Amendment dated Oct. 30, 2007, U.S. Appl. No. 11/760,358.
Co-pending U.S. Appl. No. 12/797,066 entitled, "Systems and Methods for Segmenting a Satellite Field of View for Detecting Radio Frequency Signals" filed Jun. 9, 2010.
Co-pending U.S. Appl. No. 12/360,473 entitled, "Satellite Detection of Automatic Identification System Signals" filed Jan. 27, 2009.
Co-pending U.S. Appl. No. 12/567,104 entitled, "Systems and Methods for Decoding Automatic Identification System Signals" filed Sep. 25, 2009.
Extended European Search Report dated Mar. 5, 2012, European Application No. 10178715.8.
Cervera, Miguel et al., "On the Performance Analysis of a Satellite-based AIS System", Signal Processing for Space Communications, 2008, SPSC 2008, 10th International Workshop ON, IEEE, Piscataway, NJ, USA, Oct. 6, 2008, pp. 1-8.
Naoues, Malek et al., "Design of an RF-subsampling Based Tri-band AIS and DSC Radio Receiver", Cognitive Radio and Advanced Spectrum Management, 2009, Cogart 2009, Second International Workshop ON, IEEE, Piscataway, NJ, USA, May 18, 2009, pp. 64-68.
Euronav Navigation AI3000 AIS http://www.euronay.co.uk/Products/Hardware/AIS_receivers/AIS3000/AI3000AIS_RX.htm Sep. 2009.
Smart Radio Holdings SR162 Professional AIS Receiver http://www.diytrade.com/china/4/products/254509/SR162_PROFESSIONAL_AIS_RECEIVER.html Oct. 2002.
Office Action dated Apr. 1, 2011, Australian Application No. 2008258219.
Office Action dated Apr. 4, 2012, Australian Application No. 2008258219.
Office Action dated Dec. 29, 2011, Indonesian Application No. W00200903348.
Response dated Oct. 8, 2010, European Application No. 08748111.5.
Office Action dated Apr. 17, 2012, European Application No. 08748111.5.
Office Action dated May 30, 2012, European Application No. 08748111.5.
IPRP dated Dec. 11, 2009, PCT Application No. PCT/CA2008/000666.
European Communication dated Apr. 11, 2012, European Application No. 10178715.8.
European Communication dated Aug. 2, 2010, European Application No. 09250993.4.
Response dated Oct. 1, 2010, European Application No. 09250993.4.
Response dated Aug. 23, 2011, European Application No. 09250993.4.
Summons to Attend Oral Proceedings dated Mar. 13, 2012, European Application No. 09250993.4.
Written Submissions dated Jun. 1, 2012, European Application No. 09250993.4.
Written Submissions dated Jun. 13, 2012, European Application No. 09250993.4.
Examiner's Result of Consultation dated Jun. 27, 2012, European Application No. 09250993.4.
European Communication dated Dec. 19, 2011, European Application No. 10192812.5.
Response dated Jun. 13, 2012, European Application No. 10192812.5.
Wikipedia Article, "Analog-to-Digital Converter", Jun. 7, 2009 version.

* cited by examiner

SYSTEM AND METHOD FOR DECODING AUTOMATIC IDENTIFICATION SYSTEM SIGNALS

CROSS-REFERENCE TO RELATED APPLICATION

This application is a continuation of U.S. patent application Ser. No. 11/760,358, filed Jun. 8, 2007. The entirety of U.S. patent application Ser. No. 11/760,358 is hereby incorporated by reference.

FIELD

Embodiments described herein relate to systems and methods for decoding Automatic Identification System signals. More particularly, embodiments described herein relate to systems and methods for monitoring ships that send Automatic Identification System signals by receiving the signals with a low earth orbit satellite and decoding the signals using correlation techniques.

BACKGROUND

The Automatic Identification System (AIS) is a maritime communications system designed for short-range (typically 20-30 nautical miles) ship-to-ship and ship-to-shore communications. The AIS system uses narrowband (i.e. 25 kHz Bandwidth) Very High Frequency (VHF) channels centered at 161.975 MHz and 162.025 MHz, with a possible additional channel at 157.375 MHz, and a communication method called Self-Organizing Time Division Multiple Access (SOT-DMA).

The AIS system supports a number of different types of signal. The principal AIS signal sent by a ship is a position report that provides information pertaining to the ship's identification, location, course, speed, and other details. The AIS also includes the use of a receiver, enabling a ship to receive AIS signals emitted by ships around it. Each minute, each VHF channel is divided into 2,250 time slots, each of which can accommodate one 26.67 ms AIS transmission (i.e. AIS signal). The time slots are accurately synchronized to Coordinated Universal Time (UTC) typically using Global Positioning System (GPS), and each AIS unit reserves time slots for future AIS transmissions from the ship. Other AIS units within range can therefore maintain a map of reserved slots and avoid transmitting during these intervals. This self-organizing feature avoids signal collisions over the short ranges involved in surface transmissions.

The use of AIS is now mandatory on all ships over 300 tons engaged on international voyages, and it is also being extended to other vessels. It was originally conceived as an aid to navigation and safety, and also has potential security applications for monitoring maritime traffic. AIS signal detection could be achieved using costal/ground stations, but the limited range of the VHF signals would require such costal/ground stations to be situated at many locations along the coast, and even then they could only monitor the immediate coastal region.

SUMMARY

In a first aspect, at least one embodiment described herein provides a method for detecting and decoding Automatic Identification System (AIS) signals. The method comprises:

receiving a plurality of AIS signals at a satellite in space and pre-processing the plurality of AIS signals to produce digital input data;

processing the digital input data by correlating the digital input data with a plurality of predefined signals having different Doppler offsets to compute a plurality of corresponding correlation signals and identifying one or more candidate AIS message signals based on the correlation signals;

determining Doppler offset estimates and time estimates for the one or more candidate AIS message signals;

decoding the one or more candidate AIS message signals to obtain corresponding message segments; and validating decoded message segments for proper AIS formatting.

The step of processing the digital input data comprises generating the plurality of predefined signals by applying Doppler offsets to a predetermined AIS code sequence; and scanning the plurality of correlation signals for amplitude peaks exceeding neighbouring amplitude peaks by a predetermined amount in order to identify the one or more candidate AIS message signals.

The method further comprises using at least the training sequence of an AIS signal in the predetermined AIS code sequence.

Prior to the step of decoding the one or more candidate AIS message signals, in at least some embodiments the method further comprises refining the group of one or more candidate AIS message signals to obtain a refined group of candidate AIS message signals and performing the decoding on the refined group of candidate AIS message signals.

In some cases, refining the candidate message signals comprises determining whether any of the one or more candidate AIS message signals is repeated at a different Doppler offset estimate; and removing all repeated candidate AIS message signals.

In other cases, refining the candidate message signals comprises sorting the one or more candidate AIS message signals by their corresponding time estimates; and removing all remaining candidate AIS message signals that are overlapped on their high time side by a stronger candidate AIS message signal.

In other cases, refining the candidate message signals comprises sorting the one or more candidate AIS message signals by their corresponding time estimates; determining whether any of the one or more candidate AIS message signals is repeated at a different Doppler offset estimate; removing all repeated candidate AIS message signals; and removing all remaining candidate AIS message signals that are overlapped on their high time side by a stronger candidate AIS message signal.

Before decoding, in at least some embodiments, the method further comprises re-filtering the one or more candidate AIS message signals by applying narrowband filtering centered on the Doppler offset estimate that corresponds to the one or more candidate AIS message signals.

In at least some embodiments, the method can further comprise employing a first antenna and a second antenna configured to receive the plurality of AIS signals, the first and second antennas being differentiated from one another in at least one of a spatial and a polarization manner, and before the decoding step the method further comprises combining the one or more candidate AIS message signals received by the first antenna with corresponding one or more candidate AIS message signals received by the second antenna by employing a phase-shift that maximizes the amplitude of the combined one or more candidate AIS message signals relative to any overlapping signals, and performing decoding on the combined one or more candidate AIS message signals.

In this case, in another alternative, the method can further comprise employing an additional antenna configured to receive the plurality of AIS signals, the additional antenna being differentiated from other antennas in at least one of a spatial and polarization manner, and before the decoding step the method further comprises combining the one or more candidate AIS message signals received by the additional antenna with corresponding one or more candidate AIS message signals received by the other antennas by employing a phase-shift that maximizes the amplitude of the combined one or more candidate AIS message signals relative to any overlapping signals, and performing decoding on the combined one or more candidate AIS message signals.

In at least some embodiments, the method can further comprise de-correlating the validated decoded message segments to obtain modified digital input data, and performing the processing, determining and decoding steps on the modified digital input data.

Prior to decoding the method comprises determining a more precise Doppler offset estimate and time estimate for the one or more candidate message signals.

The method can further comprise employing a Viterbi decoder in the decoding step.

The method comprises employing a low earth orbiting satellite to receive the plurality of AIS signals and pre-process the plurality of AIS signals to produce the digital input data.

In at least some embodiments, the method further comprises employing a combination of one or more low earth orbit satellites for performing the receiving step and one or more ground stations for performing at least one remaining step of the method.

At least one decoded message segment is associated with a given ship, and in at least some embodiments, after decoding, the method returns to the processing step which further comprises correlating the digital input data with a plurality of predefined signals that correspond to a subset of the at least one decoded message segment associated with the given ship; and determining whether the digital input data is a candidate AIS message signal associated with the given ship.

In another aspect, at least one embodiment described herein provides a system for detecting and decoding Automatic Identification System (AIS) signals. The system comprises a receiver configured to receive the plurality of AIS signals in space and pre-process the plurality of AIS signals to produce digital input data, the receiver being located on a satellite; a processing module configured to process the digital input data by correlating the digital input data with a plurality of predefined signals having different Doppler offsets to compute a plurality of corresponding correlation signals, identify one or more candidate AIS message signals based on the correlation signals, and determine a corresponding Doppler offset estimates and time estimates for the one or more candidate AIS message signals; a decoder configured to decode the one or more candidate AIS message signals to obtain corresponding message segments; and a validation module configured to validate the decoded message segments for proper AIS formatting.

The system is generally configured to perform the steps of the method specified above and includes components as needed for performing these steps.

In yet another aspect, at least one embodiment described herein provides a system for detecting and decoding Automatic Identification System (AIS) signals. The system comprises a receiver configured to receive the plurality of AIS signals and pre-process the plurality of AIS signals to produce digital input data; and a processing unit configured to process the digital input data to identify one or more candidate AIS message signals based on Doppler offsets associated with the digital input data, determine corresponding Doppler offset estimates and time estimates of the one or more candidate AIS message signals; decode the one or more candidate AIS message signals to obtain corresponding message segments; and validate the decoded message segments for proper AIS formatting.

BRIEF DESCRIPTION OF THE DRAWINGS

For a better understanding of the various embodiments described herein, and to show more clearly how they may be carried into effect, reference will now be made, by way of example only, to the accompanying figures in which.

DETAILED DESCRIPTION OF EXEMPLARY EMBODIMENTS

Figure 1:
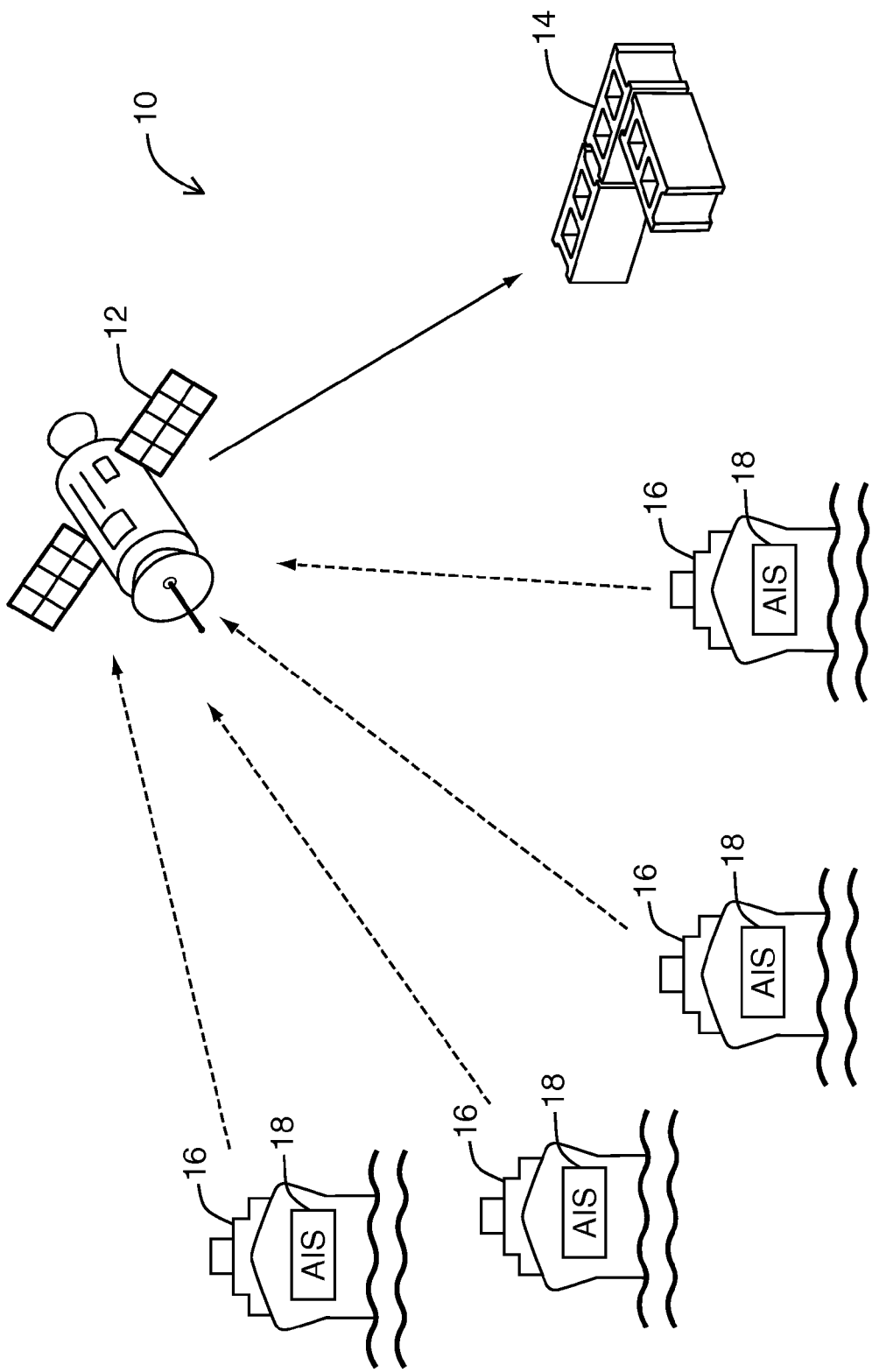
FIG. 1 is a general schematic diagram of an AIS processing system including a LEO satellite and a ground station.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

AIS signals can also be detected using low earth orbit (LEO) satellites, since the AIS signals are strong enough to be detected by a satellite. LEO satellites also provide coverage for areas that are out of range of costal/ground stations. However, the large field of view (FOV) of a LEO satellite means that the LEO satellite may receive signals from a large numbers of ships at once, particularly as the LEO satellite passes over high volume shipping areas, which typically results in a large number of AIS signals colliding or overlapping with one another. Furthermore, the large FOV of a LEO satellite means that ships in the FOV may be very far from each other and at great distances the SOTDMA communication method is not effective at avoiding signal collisions. Propagation delays also affect accurate time synchronization.

Therefore, one problem encountered in LEO satellite based AIS detection is that many of the AIS signals sent by ships will collide or overlap with one another. For example, it is estimated that there may be 2,000 ships in the FOV of a LEO satellite in high traffic areas. Each ship will typically send 10 AIS position reports per minute so for 2,000 ships a LEO satellite will receive 20,000 AIS signals per minute. This is a very large number compared to the number of available time slots (i.e. 4,500 across both VHF channels) and as a result many AIS signals will collide with one another. Therefore, although the detection of AIS signals by a LEO satellite can provide a means for monitoring a large region of shipping traffic, the viability of this approach is largely dependent on being able to decode AIS signals in the presence of a large number of overlapping signals.

Reference is first made to FIG. 1, which shows a general diagram of an AIS processing system 10 including a LEO satellite 12 and a ground station 14 for receiving and decoding AIS signals. FIG. 1 illustrates numerous ships 16 that have an AIS 18 for transmitting AIS signals that are received by the LEO satellite 12. However, as described above, due to the large FOV of the LEO satellite 12, many of the received AIS signals overlap with one another. Accordingly, embodiments described herein relate to methods and systems for effectively detecting and decoding AIS signals when many of these signals may be overlapping with one another and may also be corrupted with noise or interference.

Typically, a given ship 16 will transmit AIS signals over two narrowband (i.e. 25 kHz) VHF channels. Examples of AIS VHF channels include AIS1 at 161.975 MHz, AIS2 at 162.025 MHz, and USAIS at 157.375 MHz. To transmit the signal, the transmitting unit of the AIS 18 employs a 9.6 kbps Gaussian minimum shift keying (GMSK) modulation, which is commonly known to imply that the AIS signal will be contained within a 14 kHz bandwidth. The LEO satellite 12 is equipped with at least one VHF antenna (see FIGS. 2 and 3) and receives the AIS signal transmitted by the ship 16. The LEO satellite 12 travels at a high velocity, such as 7,500 m/s for example, and consequently the AIS signal received by the LEO satellite 12 undergoes a Doppler shift of up to +/−3.5 kHz.

The AIS signals received by the LEO satellite 12 will have a range of amplitudes, depending on the location of the ship 16 and its angular position as seen by the LEO satellite 12. Generally, the transmitting antenna used in the AIS 18 of a given ship 16 does not radiate directly upwards, and this creates a reception hole directly underneath the LEO satellite 12. However, for most of the FOV of the LEO satellite 12, the radiation patterns of the transmitting antenna of the AIS 18 tend to balance the reduced signal strength caused by increased range, and the range of received signal amplitudes is relatively modest, and is most likely less than 10 dB for most of the FOV of the LEO satellite 12. Unfortunately, the amplitude differential between overlapping AIS signals has to be quite large for conventional decoding to succeed (>10 dB). Nevertheless, in some circumstances, comparatively small amplitude differentials between overlapping signals may still provide a reasonable means to distinguish between them.

All received AIS signals are pre-processed at the LEO satellite 12 to create digital input data, which is subsequently processed by a processing unit (see FIGS. 2 and 3) so that detected AIS signals can be decoded to extract the message segment contained therein. In some embodiments, the processing occurs at the LEO satellite 12 and the extracted message segments are then downlinked to the ground station 14, as will be explained with reference to FIG. 2. In other embodiments, the digital input data is downlinked to the ground station 14 where processing occurs to produce the extracted message segments, as will be explained with reference to FIG. 3.

In alternative embodiments, there may be more than one LEO satellite 12 that receives and pre-processes, as well as possibly detects and decodes, the AIS signals. In addition, or alternatively, one or more ground stations 14 may be used to decode the pre-processed AIS signals. In another alternative, the processing required for detection and decoding can be separated between the LEO satellite 12 and the ground station 14; this scheme can also be extended to the cases in which there is more than one LEO satellite 12 and one ground station 14, one LEO satellite 12 and more than one ground station 14, or more than one LEO satellite 12 and more than one ground station 14. Accordingly, in these cases, data can be transmitted between the LEO satellite(s) and ground station(s) for processing in a variety of fashions. For simplicity, the embodiments described herein are with regards to a system with one LEO satellite 12 and one ground station 14, but the processing methodology can be extended to several LEO satellites and/or several ground stations. It is also conceivable that inter-satellite links (ISL) amongst a constellation of LEO satellites could be employed. However, this is a very costly and complex approach, and, in practice, distribution of data via the terrestrial network is likely to be employed.

Figure 2:
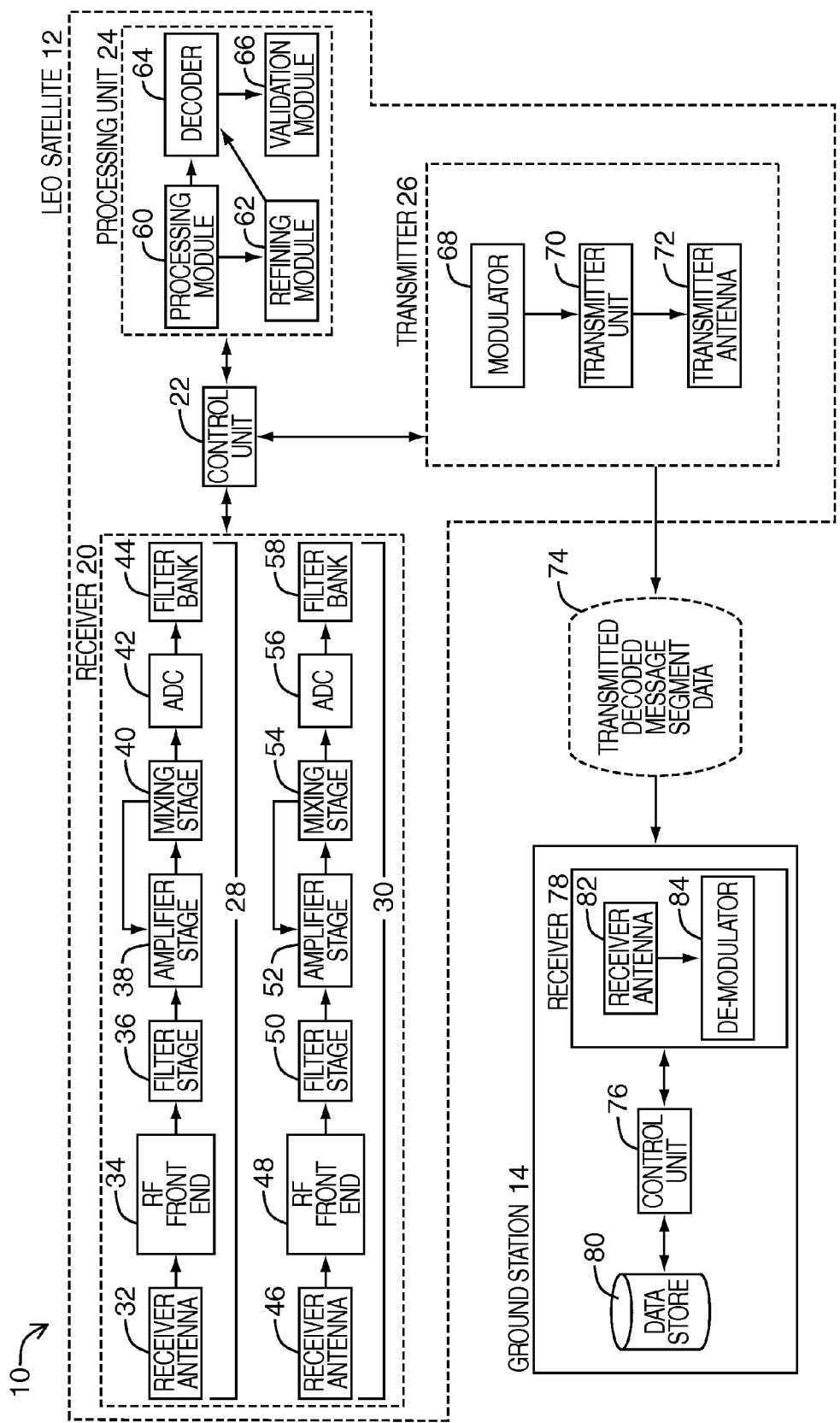
FIG. 2 is a block diagram of an exemplary embodiment for the LEO satellite and ground station of FIG. 1.

Referring now to FIG. 2, shown therein is a block diagram of an exemplary embodiment for the LEO satellite 12 and the ground station 14 of the AIS processing system 10. In general, the LEO satellite 12 comprises a receiver 20, a control unit 22, a processing unit 24, and a transmitter unit 26. The receiver 20 includes a first receiver channel 28, and a second receiver channel 30. The first receiver channel 28 includes a first receiver antenna 32, an RF front end 34, comprising a front end filter and a low noise amplifier, a filter stage 36, an amplifier stage 38, a mixing stage 40, an ADC 42 and a filter bank 44. The second receiver channel 30 includes similar components numbered 46 to 58. In some embodiments the second receiver channel 30 is not used, as will be described in more detail below. Also, in some embodiments, the mixing stages 40 and 54 are not used if the ADC 42 and 56 operates at a sufficiently adequate sampling rate. The processing unit 24 includes a processing module 60, a refining module 62, a decoder 64 and a validation module 66. In some embodiments the refining module 62 is not used, as will be described in more detail below. The transmitter 26 generally includes a modulator 68, a transmitter unit 70 and a transmitter antenna 72.

The receiver 20 receives a plurality of AIS signals and pre-processes these signals to obtain digital input data. The processing unit 24 processes the digital input data to identify and decode one or more candidate AIS message signals. After the candidate AIS message signals are decoded to determine message segments contained therein, these decoded message segments are modulated by the modulator 68 and transmitted via the transmitter antenna 72 as transmitted decoded message segments 74 to the ground station 14.

The ground station 14 is equipped with a control unit 76, a receiver 78 and a data store 80, such as a database stored on a suitable storage medium. The receiver 78 includes a receive antenna 82 and a de-modulator 84 to de-modulate the transmitted decoded message segments 74 that are received by the ground station 14. The control unit 76 controls the operation of the ground station 14, and can be used to retrieve the decoded message segments from the de-modulator 84, store these decoded message segments on the data store 80, and later recall the stored decoded message segments. The ground station 14 can also include a transmitter (not shown) for sending the decoded message segments to interested parties. For example, various security and intelligence organizations may be interested in reviewing all validated decoded message segments, and as such it is necessary to store them in the data store 80 for later recall. For instance, the decoded messages can be distributed in encrypted form via the Internet.

The receiver 20 includes two receiver channels 28 and 30, one for each receiver antenna 32 and 46. However, in some embodiments only one receiver channel is used. Accordingly, for simplicity of explanation, the components of only one receiver path will be described. The receiver antenna 32 is a Very High Frequency (VHF) antenna that is configured to receive AIS signals transmitted over the AIS1, AIS2 and USAIS channels. In embodiments with two receiver channels, the receiver antennas 32 and 46 are polarized in a different manner to provide an additional processing gain for detecting and decoding AIS signals. For example, the receiver antenna 32 can have a right circular polarization, and the receiver antenna 46 can have a left circular polarization. Typically, the transmitter antenna used by the AIS 18 of a given ship 16 transmits AIS signals with a vertical linear polarization, which generally implies that transmissions from particular locations have fairly well defined polarizations. In embodiments with two receiver channels, this polarization manifests itself as a phase shift between the AIS signals received by the two receiver antennas 32 and 46. That is, the AIS signal received by the receiver 46 will be a phase-shifted version of the corresponding AIS signal received by the receiver 32. This phase shift may provide a mechanism for distinguishing between overlapping AIS signals, as is explained further below with relation to FIG. 6. Moreover, due to the vertical linear polarization of the transmitter antenna of the AIS 18 of a given ship 16, the AIS signals that are received by the receiver antennas 32 and 46 and correspond with one another generally have similar amplitudes.

In general, the receiver 20 is configured to receive an AIS signal in the Radio Frequency (RF) range and convert it to a baseband digital signal (i.e. digital input data). This pre-processing and conversion performed by the receiver 20 may be achieved in numerous ways and incorporates standard operations in signal processing. For instance, according to the exemplary embodiment shown in FIG. 2, considering receiver channel 28, an AIS signal is first received by the receiver antenna 32 and processed by the RF front end 34. The RF front end 34 includes filtering and amplification components. The filtering components provide a first level of filtering to remove interfering signals, including intermodulation products caused by out of band carriers, as well as other noise. The filters that are used generally only have modest selectivity, but they preferably have very low loss since any loss at this stage comes directly off the overall system noise figure. At this stage, the filtering components can include a VHF filter, which can be an LC type filter, and the amplification components include a low noise amplifier following the first level of filtering to boost the signal to a reasonable level.

The output of the RF front end 34 is then processed by the filter stage 36 that provides another level of more selective filtering. The filter stage 36 includes a wide band channel filter with a passband for transmitting all three AIS channels (i.e. AIS1 at 161.975 MHz, AIS2 at 162.025 MHz, and USAIS at 157.375 MHz). Alternatively, two combined filters may be used, one filter for the AIS1 and AIS2 channel and one filter for the USAIS channel, which may eliminate some interference between the two channels (i.e. AIS1/AIS2 and USAIS). The filter stage 36 generally employs a surface acoustic wave filter that can provide the sharp filtering that is needed.

The received signals are then processed by the amplifier stage 38 for adjustment of signal amplitude so that the full quantization range of the ADC 42 can be utilized during digitization. Accordingly, the amplification stage 38 includes variable gain amplifiers and feedback can be provided from the mixing stage 40 so that an automatic gain control (AGC) block (not shown) in the amplifier stage 38 or the mixing stage 40 can adjust the amount of gain, or alternatively attenuation, that is provided by the amplifier stage 38. Alternatively, in other embodiments, the control unit 22 can include an AGC component for controlling the amount of gain, or attenuation, provided by the amplifier stage 36.

In this sense, the receiver channel 28 employs distributed amplifying and filtering using several amplification and filtering components to reduce the performance burden on any one of the components and avoid any non-linearities that may otherwise be encountered. The way in which amplification is distributed throughout this RF processing chain is a matter that depends on detailed considerations of power consumption, noise figure, and intermodulation products.

The output of the amplifier stage 38 is then processed by the mixing stage 40, and digitized by the ADC 42. The mixing stage 40 downconverts the VHF signals to an Intermediate Frequency (IF) band such as 25 MHz, which means that a lower sampling rate can be employed to reduce the requirements of the ADC 42. The ADC 42 then samples the data. If a sufficiently fast ADC is available, with sampling rates greater than 400 MHz for example, then the conversion to an intermediate frequency can be omitted altogether and digitization can occur at this point. For instance, the ADC 42 can be a band-pass sigma delta ADC. In this case, the filter bank 44 provides downconversion to shift the frequency content of the data to the baseband as explained below. Alternatively, if an I and Q mixer were used, then the mixing stage 40 can provide output data at baseband. In any of these embodiments, the mixing stage 40 also generally includes filters and amplifiers to provide further filtering and amplification or buffering. For example, filtering is employed at the output of the mixing stage 40 to eliminate image bands and local oscillator leakage. For instance, the mixing stage 40 can include a post mixer IF filter which can be an LC type filter.

The digitized data is then processed by the filter bank 44. For the case in which the data is sampled at IF, the filter bank 44 includes means for downconversion to baseband, and narrowband filters to remove all out of band signals. For instance, a 20 kHz bandwidth linear phase digital filter can be used for each AIS channel to account for the expected range in possible Doppler shifts. A component for performing decimation (not shown) can also be included at this point to reduce the output sampling rate. In some embodiments, a Digital Signal Processor (DSP) can be used to implement the filter bank 44. In this case, the DSP can downconvert the digitized data to baseband, perform narrowband filtering, and perform decimation to produce digital input data. The AD6620 digital receive signal processor is one example of a DSP that can be used to produce digital input data that includes I and Q baseband data for each of the AIS channels.

In each of these embodiments, the receiver 20 pre-processes the received AIS signals to produce digital input data. This pre-processing includes fairly standard signal processing operations that can be performed with standard commercial hardware. The organization of the hardware and the processing can be modified in various ways as is commonly known by those skilled in the art. Accordingly, the embodiments discussed herein are simply intended to provide exemplary illustrations for performing this pre-processing. For instance, in another embodiment, the output of the RF front end 34 can be digitized with an ADC and then passed to a DSP that can provide downconversion to baseband, narrowband filtering and decimation.

The digital input data is then provided to the processing unit 24 for detection and decoding of the AIS message segments. The processing unit 24 may provide the capability for parallel processing to potentially reduce computation time, as is commonly understood by those skilled in art. Once the processing unit 24 has received the digital input data, it is provided to the processing module 60 for processing. The processing module 60 processes the digital input data to identify one or more candidate message signals and determine a corresponding Doppler offset estimate and time estimate for each candidate message signal. The processing module 60 generally processes the digital input data by employing correlation techniques. For example, the processing module 60 can process the digital input data with a plurality of predefined signals that correspond to Doppler offsets of a predetermined AIS code sequence (e.g. a start flag sequence in a start flag field 126 shown in FIG. 5 can be used) to compute a plurality of correlation signals.

After computing the plurality of correlation signals, the processing module 60 scans the correlation signals for correlation peaks (i.e. amplitude peaks) that exceed other peaks by a predetermined amount in order to identify the one or more candidate message signals. Generally, the correlation peak should exceed the amplitude of any subsequent peaks that lie within one signal length (i.e. 26.67 ms) of the data segment that is being analyzed. The correlation peak associated with a candidate message signal provides an estimate of its Doppler offset and timing, as will be explained in more detail below. The processing module 60 may be implemented using a cluster of processing components, described in more detail below, to compute the correlation signals using the predefined signals that correspond to Doppler offsets of a predetermined AIS code sequence in parallel to reduce the processing time.

In some embodiments, after identifying one or more candidate message signals, the processing module 60 provides this group of candidate message signals to the refining module 62. The refining module 62 refines the group of candidate message signals by sorting the candidate message signals in this group by their corresponding time estimate. The refining module 62 may then determine whether any of these candidate message signals is repeated at a different Doppler offset estimate; if so, the refining module 62 removes all repeated candidate message signals from the group. Finally, the refining module 62 removes all candidate message signals that are overlapped on their high time side by a stronger candidate message signal. This operation ensures that time is not wasted trying to decode questionable signals. In this case, it is unlikely that a signal can be decoded if its message segment is overlapped by an equally strong, or stronger, signal, regardless of Doppler offset. The remaining candidate message signals comprise a refined group of candidate message signals, which the refining module 62 forwards to the decoder 64. The refining module 62 will typically alleviate the computational time required to decode all candidate message signals that are identified by the processing module 60, since the refined group of candidate message signals is generally (much) smaller in size than the group of candidate message signals identified by the processing module 60.

The decoder 64 decodes one or more candidate message signals to obtain (or extract) the AIS message segment contained therein. In some embodiments, the decoder 64 receives the one or more candidate message signals from the processing module 60. In other embodiments, the decoder 64 receives the one or more candidate message signals from the refining module 62. In both cases, there are no predetermined code sequences within the message segment, so correlation techniques may not be helpful to decode a candidate message signal. In some circumstances, the candidate message signals may contain specific identification numbers, such as a Maritime Mobile Service Identity, or specific locations. As such, in some cases, there may be some fixed known code sequences within the message segment, which can be used to employ correlation techniques. However, in cases where no such fixed known code sequences exist, the decoder 64 may employ various decoding procedures to extract message segments from the one or more candidate message signals. For example, the decoder 64 may perform Viterbi Decoding (or more generally dynamic programming), as is explained in further detail below. In any event, prior to decoding, a more precise Doppler offset estimate and time estimate is obtained for the candidate message signals, as will be discussed below, regardless of whether the candidate message signals have been previously refined.

After the decoder 64 extracts message segments from the one or more candidate message signals, the message segments are provided to the validation module 66. The validation module 66 validates the decoded message segments for proper AIS signal message formatting by checking each decoded message segment for valid bit stuffing and then removing all bit stuffing. The bit stuffing is required by the AIS signal specification, where a 0 is required to be inserted into the message segment after any sequence of five successive 1's in the message and frame check sequence portion of the message segment. This is done to avoid the occurrence of spurious start and stop flags. The validation module 66 then verifies a frame check sequence field of the decoded message segment. If a decoded message segment passes these checks, it is temporarily stored in a list of decoded message segments that have been validated.

The decoded message segments are then provided to the modulator 68, which digitally modulates the decoded message segments for transmission to the ground station 14. The modulator 68 may employ various digital modulation techniques such as a phase-shift keying (PSK) digital modulation scheme (i.e. modulates the phase of a signal). Examples include quadrature PSK or a higher-order PSK such as 8-PSK. The digital modulated decoded message segments are then received by the transmitter unit 70 which includes circuitry for generating analog signals that correspond to the digital modulated decoded segments, upconverts these analog signals to the frequency range required for transmission, and amplifies these signals so that they have the required signal strength that is needed for transmission to the ground station 14. These signals are then provided to the transmitter antenna 72 for transmission to the ground station 14. The transmitter antenna 72 at the LEO satellite 12 and the receiver antenna 78 at the ground station 14 can be configured for operation in, for example, the S band or the X band. In an alternative embodiment, the processing unit 24 can include the modulator 68.

In addition, since the decoded message segments may be considered to include classified information that must be kept secure, encryption can also be employed prior to modulation. In these cases, the transmission unit 26 or the processing unit 24 includes an encryption module (not shown) for encrypting the decoded message segments before the modulator 68 modulates these message segments. In this case, the ground station 14 includes a corresponding decryption module (not shown) to decrypt the received data, after demodulation, to recover the original decoded message segments.

The LEO satellite 12 also includes a memory component (not shown) so that it has the ability to store the digital input data until it is downlinked to the ground station 14. For example, the LEO satellite 12 may not always be in the FOV of the ground station 14 and so it may be necessary to store the digital input data until the LEO satellite 12 enters into the FOV of the ground station 14 at which point the data may be downlinked.

Figure 3:
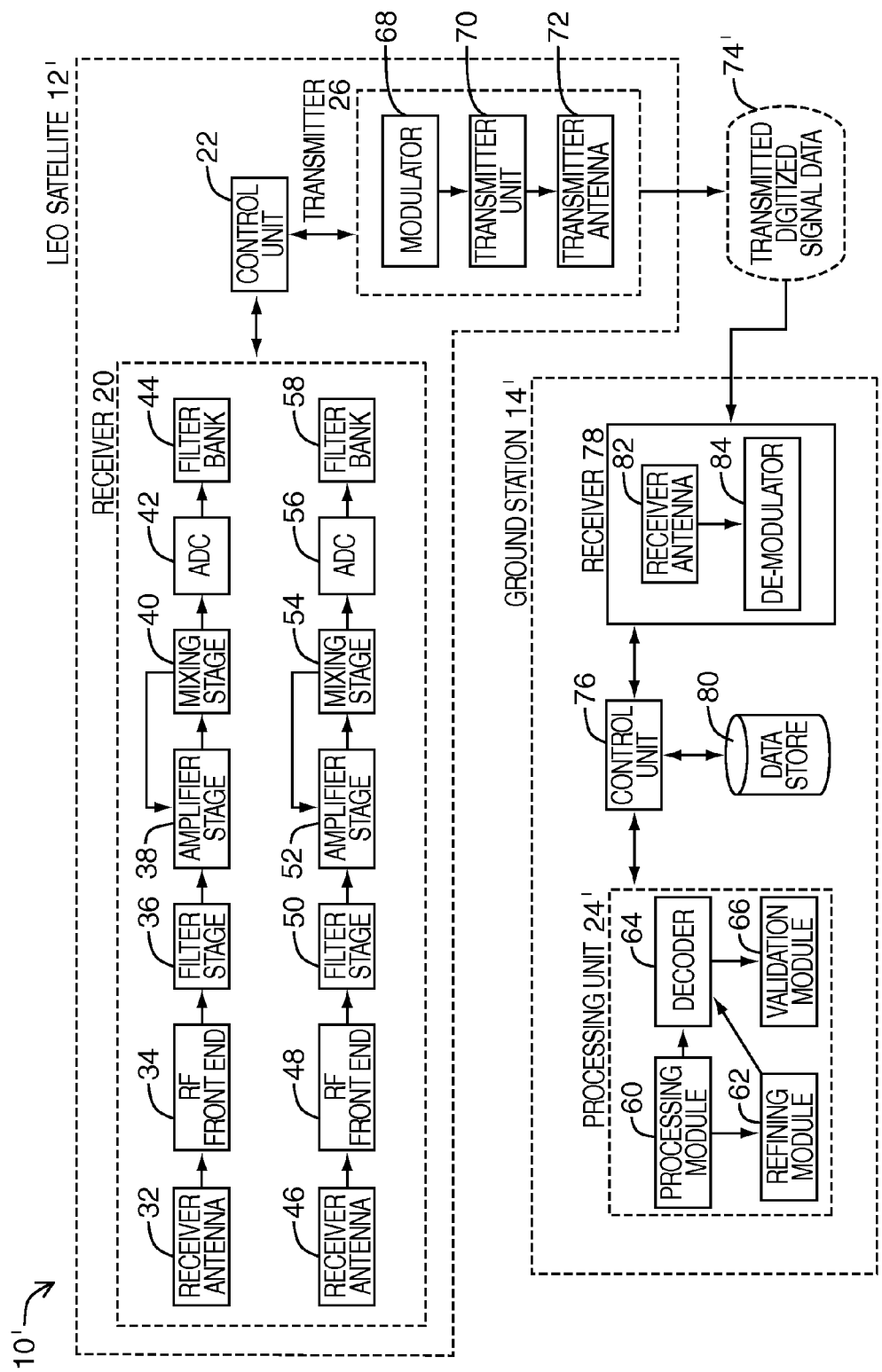
FIG. 3 is a block diagram of an alternative exemplary embodiment for the LEO satellite and ground station of FIG. 1.

Referring now to FIG. 3, shown therein is a block diagram of an alternative embodiment of a LEO satellite 12' and a ground station 14'. The general system components are analogous to those shown in FIG. 2. However, in this embodiment, the ground station 14' includes a processing unit 24', similar to processing unit 24, and the LEO satellite 12' does not have the processing unit 24. In this case, the control unit 22 receives the digital input data from the receiver 20, and provides this data to the transmitter 26 which possibly encrypts, then modulates and transmits this data as transmitted digitized signal data 74' to the ground station 14'. The receiver 78 of the ground station 14' receives the transmitted digitized signal data 74', and de-modulates this data via de-modulator 84 to produce received digital input data that is provided to the processing unit 24' in order to detect and decode candidate AIS message signals.

In some embodiments, the processing unit 24' can be a computing cluster and may be implemented as a parallel processing system using standard components such as a server (local or remote), a plurality of processors (e.g. dual core Xeon 5140 2.33 GHz processors), random access memory, virtual memory, several redundant arrays of independent drives (comprising a network file system), a hard drive, and a software operating system (e.g. Linux). These components are linked over a dedicated network connection and although they are illustrated as being contained within a single ground station 14', various components may be located locally or remotely with respect to the ground station 14.

The specifics of the downlink path are not described in detail, as it is largely dependent upon frequency allocations obtained from regulatory bodies. However, when the detection and decoding is performed at the ground station 14', the system 10' can be configured such that the downlink path accommodates a data transmission rate of around 3 Mbps. Otherwise, the components of the LEO satellite 12' and the ground station 14' operate in an analogous fashion to the components of the LEO satellite 12 and the ground station 14.

It should be noted that the control units 22 and 76 and the processing units 24 and 24' can be implemented using a processor. Furthermore, in some embodiments, the control unit 22 and the processing unit 24 can be implemented with the same processor. Likewise, in some embodiments, the control unit 76 and the processing unit 24' can be implemented with the same processor. In addition, in some embodiments, the transmitter 26 and the receiver 78 can also employ a processor. Furthermore, it should be noted that the various embodiments of the LEO 12 and 12' and the ground station 14 and 14' generally employ a combination of hardware and software. For instance, the components of the processing unit 24 and 24', the modulator 68 and the de-modulator 84 can be implemented using software. Furthermore, it should be understood that there can be embodiments in which these components are organized in a different fashion but perform the same functionality.

In addition, although the embodiments shown in FIGS. 2 and 3 illustrate two particular system configurations, it should be understood by those skilled in the art that numerous other system configurations can be employed. For example, some components of the processing unit can be implemented at a LEO satellite, such as the processing module, while other components, such as the decoder or the validation module, can be implemented at a ground station.

Figure 4:
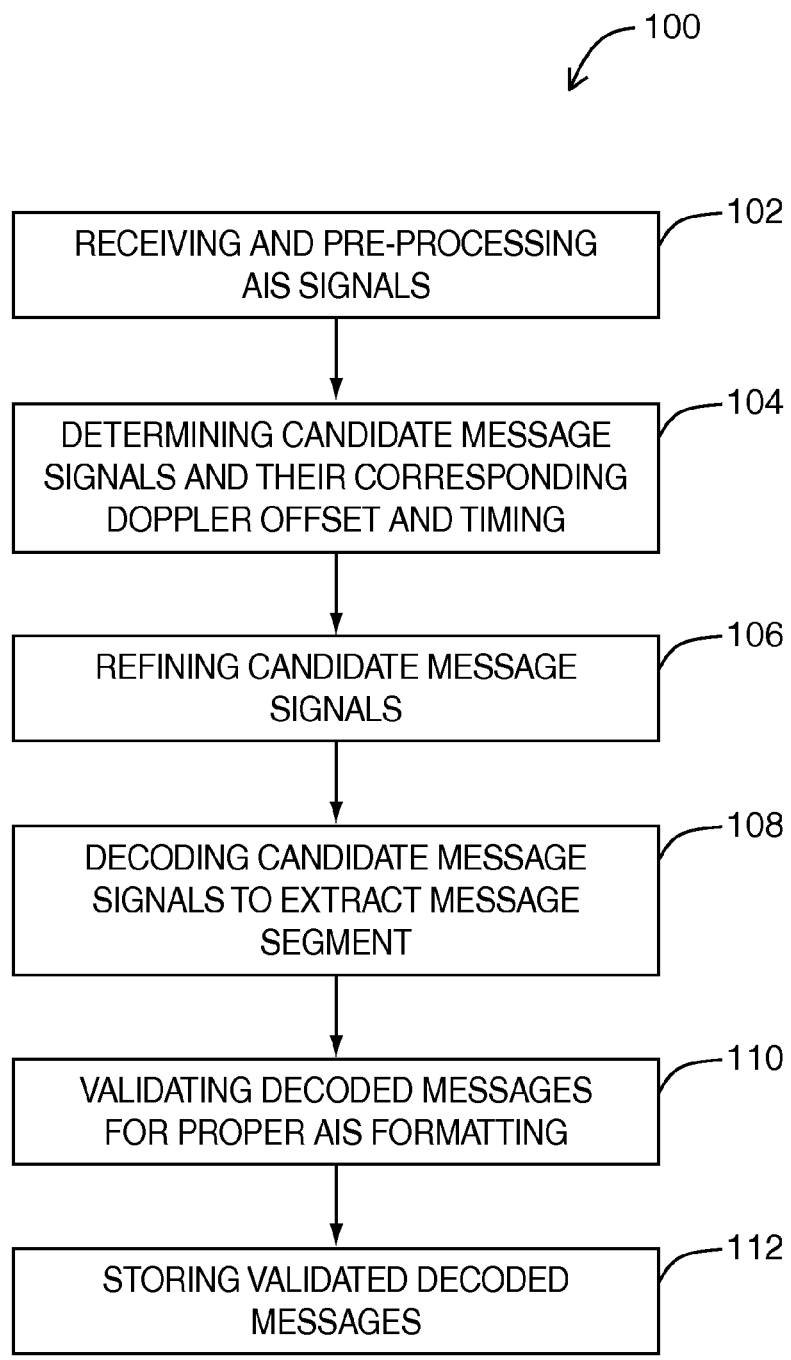
FIG. 4 is a flowchart diagram of an exemplary embodiment of a method for detecting and decoding AIS signals.

Referring now to FIG. 4, shown therein is a flowchart diagram of an exemplary embodiment of a method 100 for detecting and decoding AIS signals. At step 102, a plurality of AIS signals transmitted by a plurality of ships are received by the LEO satellite 12 and pre-processed to obtain digital input data. As explained above, generally the pre-processing converts the received AIS signals into a baseband digital form using filtering, amplification, and mixing, for example. At step 104, the digital input data is processed to identify one or more candidate message signals, along with a corresponding Doppler offset estimate and time estimate for each candidate message signal. The time estimate is the arrival time of the AIS signal in question at the LEO satellite 12. It may be thought of as the time location of some particular marker within the signal, for instance the start of a training sequence. The underlying approach to processing the digital input data is to rely on the fact that AIS signals contain predetermined code sequences as shown in FIG. 5.

Figure 5:
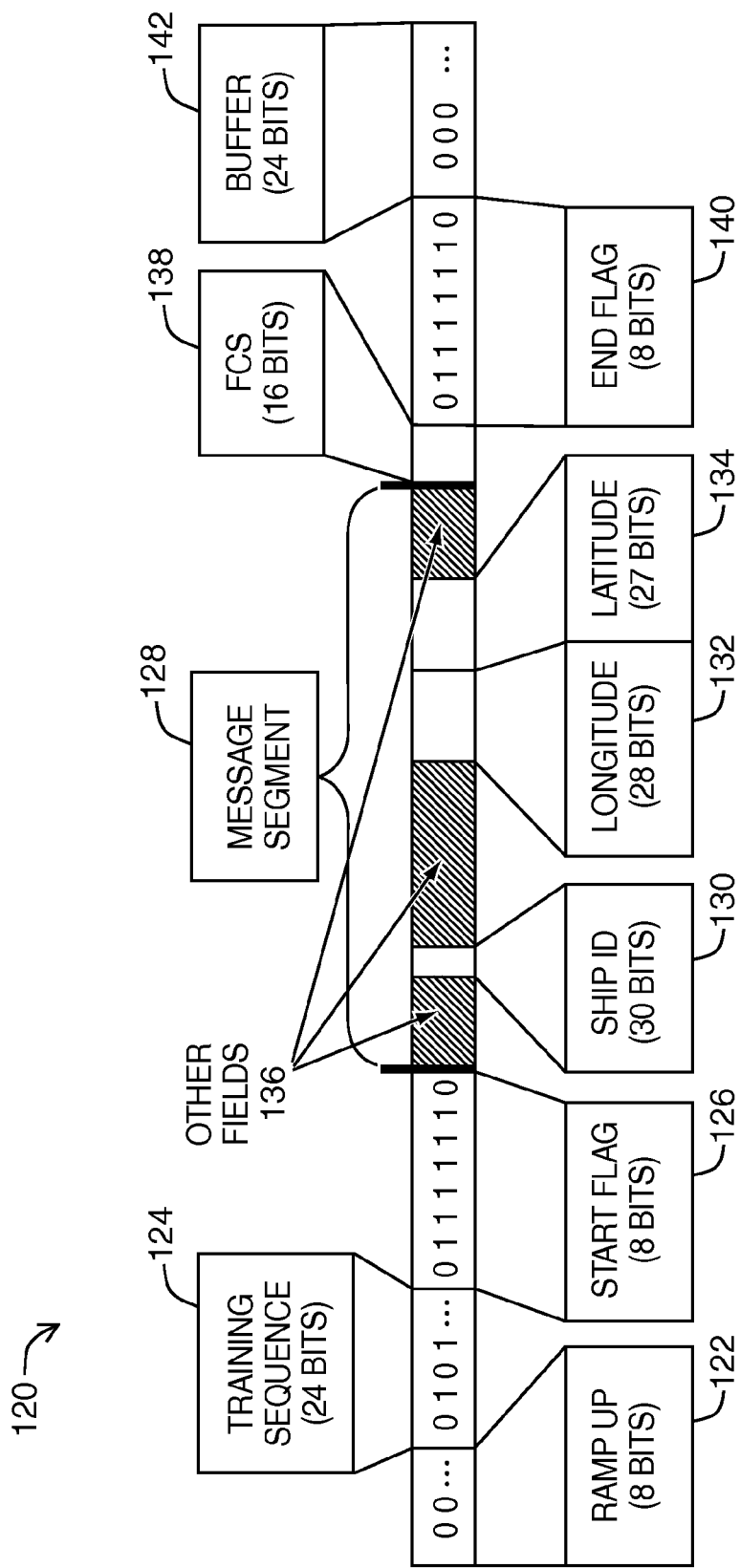
FIG. 5 is a diagram illustrating the data structure of an AIS message signal.

Referring now to FIG. 5, shown therein is a diagram illustrating the data structure of an AIS message signal 120. The AIS message signal 120 includes a ramp-up field 122, a training sequence 124, a start flag field 126, and a message segment field 128 including a ship ID field 130, a longitude field 132, a latitude field 134 and several other fields 136. The AIS message signal 120 also includes a Frame Check Sequence (FCS) field 138, an end flag field 140 and a buffer field 142. The ramp-up field 122 usually coincides with the powering up of the transmitter of the AIS 18 of a given ship 16. The training sequence field 124 is included to allow the receiver of a conventional AIS 18 to perform carrier recovery. The start flag field 126 is a predetermined AIS code sequence that is generally used by various embodiments described herein to process the digital input data to identify one or more candidate message signals, as will be explained. The message segment field 128 contains information relating to the ship 16 from which the AIS signal was sent, such as the ship ID 130 and the longitude 132 and the latitude 134 of the ship location. The other fields 136 also include information related to the ship including the navigation status, rate of turn, true heading, etc. as well as other information such as a time stamp indicating when the information was obtained. The frame check sequence field 138 is used for error detection, and can be used to determine whether any AIS message signal data is lost or altered during transmission. The end flag field 140 is another predetermined AIS code sequence that may be employed during decoding as will be explained in further detail below. The buffer field 142 may change in length, so that even if bit stuffing is required the overall AIS message signal length remains constant.

Referring back to FIG. 4, at step 104, the digital input data is processed by relying on the fact that the AIS message signals contain predetermined code sequences such as the training sequence and start flag fields 124 and 126 and the end flag field 140. Other fixed known code sequences may also exist within the AIS message signal that can also be used, but for simplicity, the processing in this exemplary method 100 will use at least the data in the training sequence field 124, i.e. in some case predefined signals are based on the training sequence field 124 while in other cases the predefined signals are based on both the training sequence and start flag fields 124 and 126 (i.e. a combination of the training sequence and the start flag sequence). In other cases, a portion of the message segment may also be used since the first byte of the message segment 128 is also reasonably predictable. Generally, step 104 employs correlation techniques by correlating the training sequence and start flag fields 124 and 126 with predetermined code sequences at a plurality of different Doppler offsets to produce a plurality of correlation signals (which can also be referred to as correlation functions). The generated correlation signals can then be used to identify one or more candidate message signals contained within the digital input data. Generally, a peak in the amplitude of the correlation signal (i.e. a correlation peak) is used to identify a candidate message signal along with an estimate for its timing, using the position of the amplitude peak, and an estimate of its Doppler offset which will be the Doppler offset associated with the predefined signal that was used in the correlation. Further details on an exemplary implementation of the processing in step 104 are explained later in relation to FIG. 7.

The method 100 can then decode the identified candidate message signals in step 108 to extract the message segments contained therein. Optionally, the method 100 can include step 106 in which the candidate signal messages identified in step 104 are refined to produce a refined (and typically smaller) group of candidate message signals that can then be decoded in step 108. An exemplary implementation of the refining step is described in relation to FIG. 8. The underlying approach to the refining step is that generally a large number of candidate message signals will be identified at step 104, but due to overlapping signals, it may be difficult to decode the candidate message signals. Therefore, for computational efficiency, refining can be performed to remove and/or replace repeated and overlapped candidate message signals so that decoding is performed on a smaller group of candidate message signals.

At step 108, the group of candidate message signals is decoded to extract the message segment contained therein. As explained above, in general, there are no fixed known code sequences within the message segment, so correlation techniques may not be helpful to decode the candidate AIS message signal. However, other techniques can be employed to decode candidate AIS message signals, such as dynamic programming techniques, or more specifically Viterbi decoding. Furthermore, prior to decoding, a more precise Doppler offset estimate and time estimate is obtained for the candidate message signals, as previously mentioned.

Fine adjustment of the correlation signals is performed to obtain a more accurate determination of the timing and Doppler offset for each of the candidate message signals. This fine adjustment procedure relies on the Schwarz inequality (see equation (5) further below), which shows that the maximum overlap integral is obtained when the two functions being correlated are identical. This fine adjustment procedure uses the same predetermined AIS code sequences used to generate the predefined signals at the correlation step. The timing and the Doppler offset estimates of the predefined signals are then adjusted slightly to maximize the overlap integral with respect to the candidate message signal, with the initial Doppler offset estimate and timing estimate used as a starting point. The resulting values from the fine adjustment typically represent the best achievable estimates of timing, phase and Doppler offset, i.e. an accurate Doppler offset, time and phase for the identified candidate message signal. Maximizing the overlap integral involves maximizing a function of two variables given a good starting point. This can be performed by using a standard mathematical optimization routine, such as the Newton method, for example.

When decoding a candidate AIS message signal, Viterbi decoding employs the Viterbi algorithm to decode a bitstream, or in this case a message segment. However, during the decoding process, numerous sub-message segments are generated (i.e. partial paths as is explained further below) and it is then necessary to select the best message segment from this group of possible sub-message segments. This selection of the best message segment is done in the absence of any specific knowledge about the message segment contained within the candidate AIS message signals, since it is assumed that nothing is known about the contents of the message segment in order to use a broader decoding implementation. To select the best message segment, decoding may include determining which sub-message segment (of the group of sub-message segments) gives the closest possible match to the candidate AIS message signal. Many possible measures of closeness can be employed; one example is to choose the sub-message segment that minimizes the least squares error estimate.

In general, at any point the Viterbi decoding can be regarded as being in one of a certain number of possible states. The operation of the Viterbi algorithm can be understood with the aid of a trellis diagram (not shown), which illustrates the possible states and paths. The Viterbi decoder will begin at a starting point (or starting state) and as the decoder steps forward in time, each state may make a transition to one or more subsequent states. This generates a number of possible paths through the trellis (i.e. the sub-message segments mentioned above). Depending on the number of states and the length of the message segment to be decoded, the number of possible paths may get very large.

In the context of decoding AIS message signals, a suitable starting point (or state) for the Viterbi decoder may be the predetermined code sequence at the start of the AIS message signal, namely the start flag field 126. From this starting point, the Viterbi decoder will make a transition to one or more of the subsequent states, generating a number of possible paths (i.e. the sub-message segments noted above) before terminating. An AIS message signal contains another predetermined code sequence that will help terminate a path, specifically the end flag field 140. Therefore, the Viterbi decoder continues to step forward in time to generate a number of paths (i.e. sub-message segments) until the contents of the end flag field 140 is detected in a specific path. When the contents of the end flag field 140 are detected, that specific path will terminate.

In order to determine the Viterbi decoder configuration in the context of AIS message signals, one can consider AIS message signal properties. As explained above, AIS signals are transmitted using GMSK modulation, where the message segment (i.e. sequence of bits) is transformed into waveforms (which form the AIS signal) for transmission. Looking first at simple baseband MSK (Minimum Shift Keying), the waveform of the signal corresponding to each bit period is in one of two forms (generally opposites) depending on whether the bit is a 0 or a 1. Each bit advances or retards the phase of the signal by $\pi/2$ depending on whether it is a 1 or a 0 respectively. The preceding bits only affect the current bit in so far as they fix the starting phase, which can take one of four possible values: $0, \pi/2, \pi,$ and $3\pi/2$. A Viterbi decoder with four states is therefore appropriate for this type of decoding where, at each time step (i.e. bit interval), the states are defined by the four possible starting phases fixed by the preceding bits (e.g. $0, \pi/2, \pi, 3\pi/2$).

In GMSK modulation, each bit produces a total phase shift of $\pm\pi/2$, but the effect of each bit is spread out over several steps in time. However, as an approximation, this effect can be neglected beyond the nearest neighbour intervals. In other words, to determine the waveform associated with a particular bit, such as a 0 for example, the bits that both precede and follow the particular bit are needed. For an approximation, the waveform in any bit interval will have one of eight possible forms, rather than the two required for simple MSK. In this approximation, a Viterbi decoder for GMSK modulation requires 16 rather than 4 states, where the state at a boundary between bits is defined by the preceding bit, the following bit, and the four possible phase states (i.e. 0, $\pi/2$, $\pi$, and $3\pi/2$) produced by all other preceding bits. However, if the phase state at any point is 0 or $\pi$, then the decoder can only transition to phase states of $\pi/2$ or $3\pi/2$ at the next step and vice versa. Furthermore, all paths in the trellis begin at one starting state, as determined by a predetermined code sequence, such as the data in the start flag field 126. Therefore, only 8 of the 16 possible states can be active at any subsequent step. Therefore, the Viterbi decoder for decoding AIS message signal segments has effectively 8 states.

As explained above, each path in the trellis corresponds to a particular sequence of bits, which may become a message segment when the path is terminated. However, considering that an AIS message segment, including the data in the frame check sequence field 138, is at least 184 bits long and that the Viterbi decoder effectively has 8 states, the total number of possible paths (i.e. sub-message segments) can be quite large. Therefore, a workable Viterbi decoder should attempt to end most of these paths at intermediate points and not follow them all the way through the trellis, as explained above. By reducing the number of paths, this is turn reduces the number of possible message segments decoded from the candidate AIS message signal. This can be done using what is sometimes referred to in dynamic programming as Bellman's principle of optimality. This requires that when two or more paths meet at the same state at a particular time point, only the partial path (i.e. sub-message segment) with the best performance measure is retained. The path with the best performance measure is the path that is closest to the actual signal, to that point, according to the chosen performance measure. The rationale for this procedure is that any path proceeding from that state and time point will have a better overall performance measure if it is associated with the survivor path (i.e. a previously retained path) rather than with any of the paths that were discarded. It also ensures that the number of active paths at any time point cannot exceed the number of states (since only one path is selected whenever two or more paths meet at the same state).

Many techniques may be employed to determine which partial path has the best performance measure. However, the technique used to select the best partial path should be able to select the best partial path in the absence of any specific knowledge about the message segment contained within the candidate AIS message signal. One exemplary technique that can be used to choose the best partial path minimizes the least squares error estimate. For example, the least squares error estimate may be expressed as:

$$E = \sum_{i=1}^{N} \int_0^T |a_i(t) - s(t+(i-1)T)|^2 dt \qquad (1)$$

where s(t) represents the candidate AIS message signal, and $a_i(t)$ represents the theoretical waveform associated with a partial path at the $i^{th}$ bit interval, T is the duration of a bit interval (1/9600 s), and N is the number of bit intervals in the candidate message signal. The least squares technique then selects the $a_i(t)$ that minimize the above equation.

The least squares error estimate can also be expressed as:

$$E = \sum_{i=1}^{N} \int_0^T |a_i(t)|^2 - 2Re(a_i(t)s^*(t+(i-1)T)) + |s(t+(i-1)T)|^2 dt \qquad (2)$$

where s*(t) is the complex conjugate of s(t). Many performance measures may be employed. Normally the measure would be some positive number that is zero only when the two functions are identical. A typical choice would be an $L_p$ norm which is of the form $$F = \left( \sum_{i=1}^{N} \int_0^T |a_i(t) - s(t+(i-1)T)|^p dt \right)^{1/p}.$$

The current choice corresponds to p=2. This is by far the most common choice, as it is usually the simplest mathematically, and it has theoretical justification in many cases. The choices p=1 and p=∞ are also quite popular; p=1 can be used. Other values of p may also be used in some cases.

Now factoring in that the theoretical waveform (i.e. the waveform representation of the partial path) is phase modulated only, then $|a_i(t)|$ is a constant, and so minimizing E is equivalent to maximizing P, where P is expressed as:

$$P = \sum_{i=1}^{N} \int_0^T 2Re(a_i(t)s^*(t+(i-1)T))dt \qquad (3)$$

In order to employ the technique described by equation (2) a specific value for $|a_i(t)|$ must be set at the start of decoding. This would normally be estimated from the amplitude of the predetermined code sequence at the start of the AIS message signal, namely the amplitude of the data in the start flag field 126. Such a specific amplitude estimate is not required to use equation (3). The $i^{th}$ interval is one bit period, which in this case is 1/9600 s.

As noted above, generally the data in the AIS message segment field 128 and the frame check sequence field 138 is at least 184 bits long (the message segment field 128 is 168 bits long and the frame check sequence field 138 adds a further 16 bits). Moreover, the AIS specification requires bit-stuffing, such that a 0 is inserted after any sequence of five successive 1's in the message and frame check sequence portions of the code. This is done to avoid the occurrence of spurious start and stop flags. Up to four of these bit-stuffing bits may occur, which increases the overall length of the message segment field 128 and the frame check sequence field 138 to a maximum of 188 bits.

Therefore, a message segment will be between 184-188 bits and so in this context the Viterbi decoder will terminate a path if a valid stop flag is encountered after between 184 and 188 bits have been extracted. In very rare cases more than one path with a valid stop flag is found for a given candidate AIS message signal. Even if this happens, all extracted message segments are passed on to step 110 for validation.

At step 110, the decoded candidate message signals are validated to ensure that they have proper AIS formatting. This may involve checking the decoded candidate message segments for a valid bit-stuffing format, as explained above. The bit-stuffing bits are then removed and the frame check sequence field 138 is checked. If a validated list of decoded message segments is desirable (i.e. for later storage and recall) then all decoded message segments that pass this validation step can be added to a list of validated decoded message segments and stored at step 112. Generally, if a message segment is partially correct it will not pass the validation step. However, alternative embodiments may use these partially extracted message segments for further message segment extraction. At step 112, all decoded messages segments can be stored for later recall. Alternatively, there can be embodiments in which only the list of validated decoded message segments are stored.

An optional extension to method 100 is to de-correlate all decoded message segments from the digital input data (i.e. subtracting off the best-fit representation of signals corresponding to the extracted message segments from the initial input data). This can be done after the validation step 110. The method 100 may then return back to step 104 and re-process the modified digital input data in an attempt to identify additional candidate AIS message signals, which can then be decoded to extract further message segments.

Another optional extension to this method 100 recognizes that AIS message signals sent from a single ship 16 will have substantial common message segments. Therefore, repeated messages from any given ship 16 can provide another mechanism for enhancing detection and decoding. For example, a previously detected message segment from a given ship 16 may be used to generate the predefined signal used in obtaining the correlation signals. Moreover, the previously decoded message segments may provide the option of using correlation techniques when decoding any candidate message signals. In such an embodiment, the decoder 64 is further configured to employ correlation techniques using the previously decoded message segments when decoding the candidate AIS message signals. If parts of the message sequence, such as the MMSI (i.e. ship id), are known, then these may also be used as part of the fixed code sequences used in the correlation procedure in step 104. A longer fixed code sequence discriminates better against other signals and gives an enhanced probability of detection. For example, when extracting the message sequence by a Viterbi decoder, the presence of known code sequences predefines segments of the paths and improves the overall probability of successful decoding.

Figure 6:
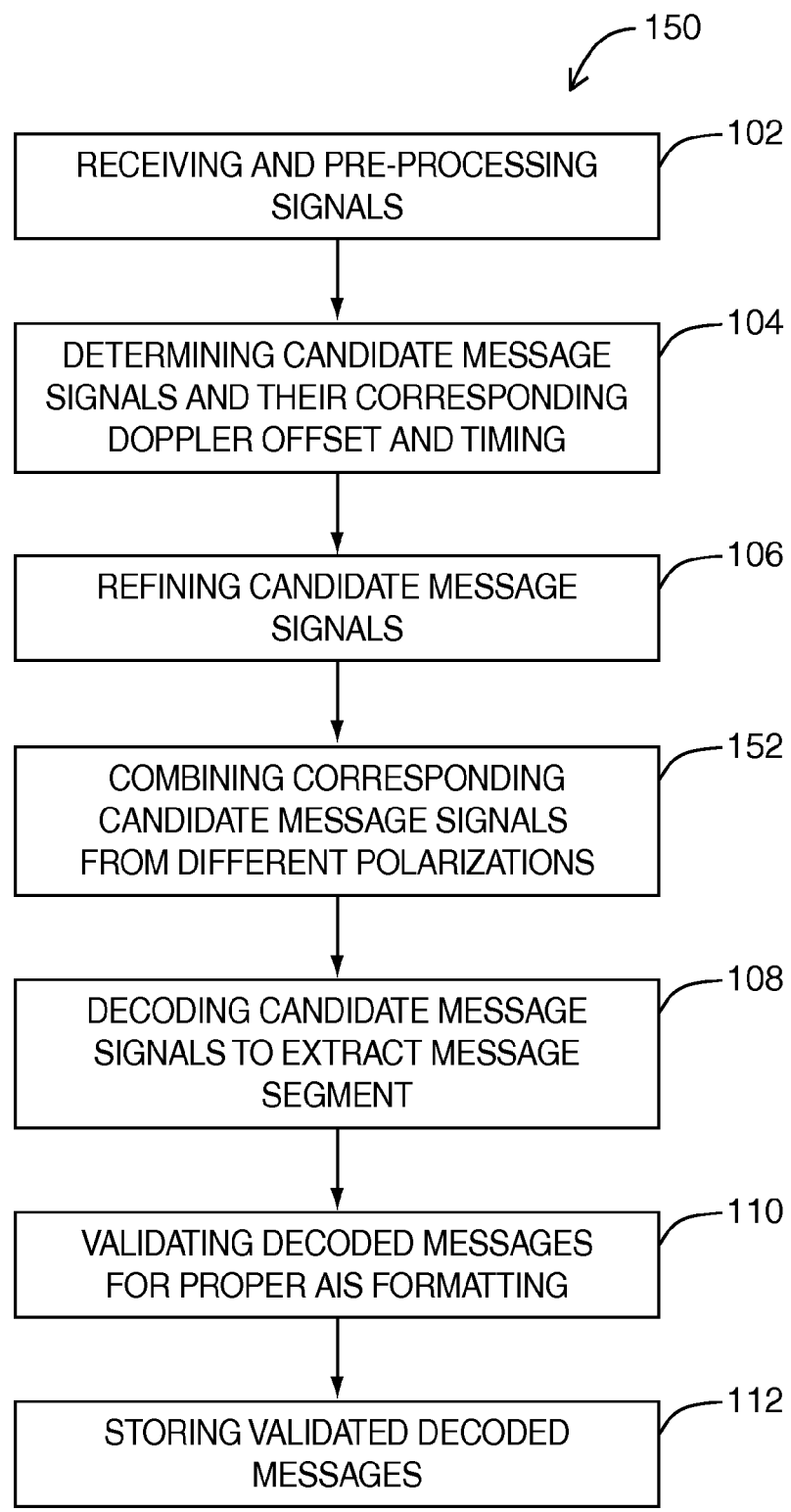
FIG. 6 is a flowchart diagram of another exemplary embodiment of a method for detecting and decoding AIS message signals.

Referring now to FIG. 6, shown therein is a flowchart diagram of another exemplary embodiment of a method 150 for detecting and decoding AIS message signals. The method 150 is similar to method 100. However, the method 150 includes step 152 which corresponds to embodiments of the LEO satellite in which two receiver channels are used. In these embodiments, at step 152, the candidate message signals that correspond to one another, but have different polarizations (i.e. AIS signals received by receiver antennas 32 and 46), are combined with a phase shift that maximizes the amplitude of the resulting combined candidate AIS message signal relative to that of any overlapping signal.

As explained above, a given AIS signal received by both receiver antennas 32 and 46 results in two corresponding candidate AIS message signals with two different polarizations, where one candidate AIS message signal is a phase-shifted version of the other candidate AIS message signal and both have comparable amplitudes. This phase shift might be anywhere in the range 0 to 360°. The two corresponding message signals are identified from corresponding (essentially equal time) correlation peaks identified at step 104. The phases of the two correlation functions at their corresponding peaks determine the phase difference between the corresponding messages. One or both of the two candidate AIS message signals may be overlapped by another message signal. However, applying a phase shift to one or both of the two corresponding candidate AIS message signals and then combining these signals may cancel any unwanted overlapping signals, or at least reduce the strength of these unwanted signals. Moreover, this step attempts to maximize the amplitude of the combined candidate AIS message signal (relative to any overlapping signal), to produce a stronger signal for decoding. The combined candidate AIS message signal can then replace the two corresponding candidate AIS message signals and be decoded at step 108. In alternative embodiments, step 152 can be performed by detection and decoding methods that do not employ the refining step 106.

Alternatively, at step 152, the two corresponding candidate AIS message signals are simply combined by employing a variety of fixed phase-shifts to create a sub-set of combined candidate AIS message signals. If a candidate AIS message signal is overlapped by an unwanted signal with a different polarization, then it may be desirable to combine the candidate AIS message signal with the corresponding candidate AIS message signal (received by the other receiver antenna) by employing a phase shift that cancels the overlapped unwanted signal. In this case, to determine the optimal phase-shift, one may employ a variety of fixed phase-shifts, such as 8 different phase-shifts starting a 0° and advancing in steps of 45°, for example. The underlying strategy is to find a phase-shift that best cancels one or more of the unwanted overlapping signals to give a better chance of successful decoding. This strategy is computationally more expensive than that previously described because decoding must be attempted on multiple combinations of the signals in the two polarizations. However, in practice, it is somewhat more successful in extracting codes.

Figure 7:
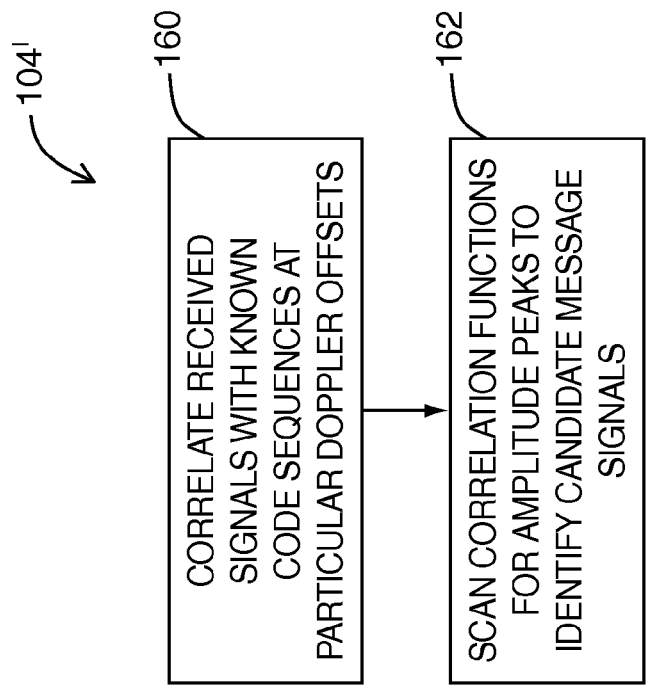
FIG. 7 is a flowchart diagram of an exemplary embodiment of a method for processing digital input data to identify candidate message signals.

Referring now to FIG. 7, an implementation 104' of the processing step 104 is illustrated in more detail. At step 160, the digital input data, which represents the plurality of received AIS signals in one or both polarizations, depending on the number of receiver channels, is correlated with a number of pre-defined signals to produce a plurality of correlation signals. Each of these pre-defined signals corresponds to a particular known AIS message signal sequence at a particular Doppler offset. The number of pre-defined signals is chosen so that there is always one pre-defined signal with a Doppler shift that is sufficiently close to that of any possible received AIS signal so that the correlation peak can be detected with a minimal loss of amplitude. A Doppler offset between the pre-defined signal and the actual signal will reduce the amplitude of the correlation peak. A tolerance on allowable loss of amplitude must be selected, such as 0.5 dB for example. This then fixes the allowable Doppler offset to $\Delta f$ for example. If the predefined signals are then chosen so that their Doppler offsets are spaced apart by $2\Delta f$, then any actual signal will necessarily be within $\Delta f$ of one of the predefined signals. This correlation operation may be implemented by using a bank of matched filters (or more generally correlators). In some embodiments, the bank of matched filters can be selected to allow some mismatch so as to reduce the sidelobes of the correlation peak, so that they will not be confused as other candidate message signals at step 104, as will be explained further in relation to FIGS. 9a-9c.

At step 162, each correlation signal is scanned for peaks whose amplitudes exceed those of any subsequent peaks that lie within the same signal length (i.e. 26.67 ms) by some specified amount (such peaks may be herein referred to as correlation peaks). The correlation peaks in a correlation signal identifies candidate AIS message signals, as it provides an indicator that a signal similar to the predetermined AIS message code sequence used to generate the pre-defined signal is contained within the digital input data segment that is currently being processed.

The act of identifying correlation peaks in the plurality of generated correlation signals whose amplitudes exceed a predetermined amount provides a coarse estimate of the timing and Doppler offset of an identified candidate message signal. This principle can be applied to many types of modulation. This is due to the discovery that if a peak occurs in a correlation signal then it is likely that the two signals (i.e. the identified candidate AIS message signal and the predefined signal) have similar Doppler offsets. Any peak in a correlation signal will be greatly reduced, or even removed completely, if the two correlated signals (i.e. the identified candidate message signal and the predefined signal) have different Doppler offsets. This will be explained in further detail later in relation to FIGS. 10a-10c. Accordingly, the estimated Doppler offset will be the Doppler offset used for the pre-defined signal in correlation signals that have an identifiable correlation peak.

To provide a more thorough explanation of how the generated correlation signal provides a means for identifying candidate AIS message signals and discriminating between overlapping signals with different Doppler offsets, reference will now be made to FIGS. 9a-9c and FIGS. 10a-10c, which show graphical representations of various correlation signals. Generally speaking, the correlation function provides a measure of how well one signal matches to another signal (or a time-shifted version of another signal). The correlation function used to generate the correlation signal for two complex signals may be written as:

$$c(t) = \int_{-\infty}^{\infty} r(\tau) s^*(\tau - t) d\tau \quad (4)$$

It is understood by those skilled in the art that the Schwarz inequality states that:

$$\left| \int_{-\infty}^{\infty} a(\tau) b^*(\tau) d\tau \right|^2 \leq \int_{-\infty}^{\infty} |a(\tau)|^2 d\tau \int_{-\infty}^{\infty} |b(\tau)|^2 d\tau \quad (5)$$

Therefore:

$$\left| \int_{-\infty}^{\infty} r(\tau) s^*(\tau - t) d\tau \right|^2 \leq \int_{-\infty}^{\infty} |r(\tau)|^2 d\tau \int_{-\infty}^{\infty} |s(\tau - t)|^2 d\tau = \quad (6)$$

$$\int_{-\infty}^{\infty} |r(\tau)|^2 d\tau \int_{-\infty}^{\infty} |s(\tau)|^2 d\tau$$

Generally, autocorrelation is a measure of how well a signal matches itself. Using the above formulas, an autocorrelation function for a signal may be expressed as:

$$\left| \int_{-\infty}^{\infty} s(\tau) s^*(\tau - t) d\tau \right| \leq \int_{-\infty}^{\infty} |s(\tau)|^2 d\tau \quad (7)$$

where equality holds when t=0. In the equations (4) to (7), c(t) is the correlation function, r(t) is a first complex signal, s(t) is a second complex signal, a(t) and b(t) are arbitrary complex functions, and * denotes complex conjugate.

Correlating a signal with an identical replica implies that there is a minimum mismatch of 0 dB between the waveforms. However, such a procedure may have significant weaknesses. The correlation signal has its maximum amplitude when the signals exactly overlay each other, but the correlation signal may also have other significant peaks or sidelobes. When computing correlation signals using segments of the digital input data, such sidelobes can be confused with other candidate message signals, so it is important to ensure that these sidelobes are adequately suppressed.

Figure 9A:
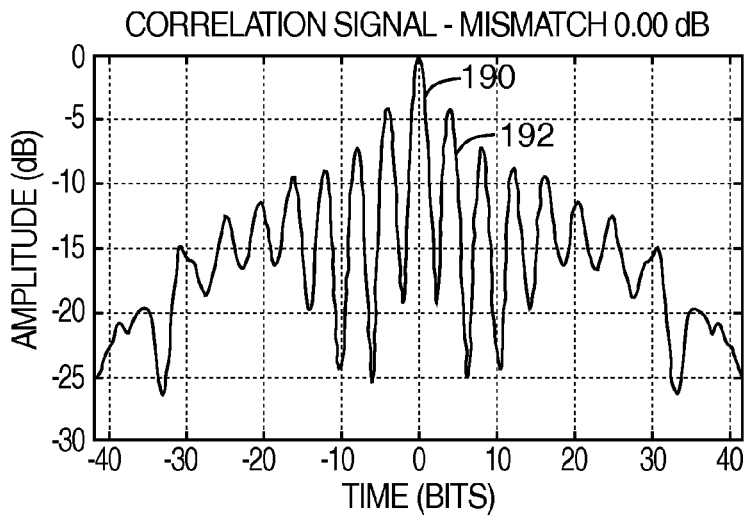
FIGS. 9A, 9B and 9C are graphical illustrations of correlation signals.

Referring to FIG. 9a as an example, shown therein is a correlation signal resulting from the correlation of a signal with an exact replica of itself (i.e. the mismatch loss is 0 dB). The signal corresponds to an exemplary known AIS message signal code sequence that may be used to generate the pre-defined signals used in step 160. The known code sequence used in this example is 40 bits long and comprises a training sequence (24 bits), a start flag (8 bits), and the first byte (8 bits) from a message segment (see FIG. 5). It can be seen that the sidelobes 192 are approximately 4 dB below the correlation peak 190, which is large enough that the sidelobes 192 may be confused as other candidate message signals (as they appear to be peaks), when scanning the correlation signal for correlation peaks at step 162. To scan for peaks, a threshold value can be selected empirically. Basically, a very low threshold value will identify many spurious peaks, and a great deal of computer time may be expended uselessly trying to decode them. Conversely, a high threshold value may unnecessarily exclude valid peaks. A value of around 4 dB has been found to be a reasonable practical compromise. The great majority of the spurious peaks generated within an AIS signal are more than 4 dB below the main correlation peak (see FIG. 10a for example).

Figure 9B:
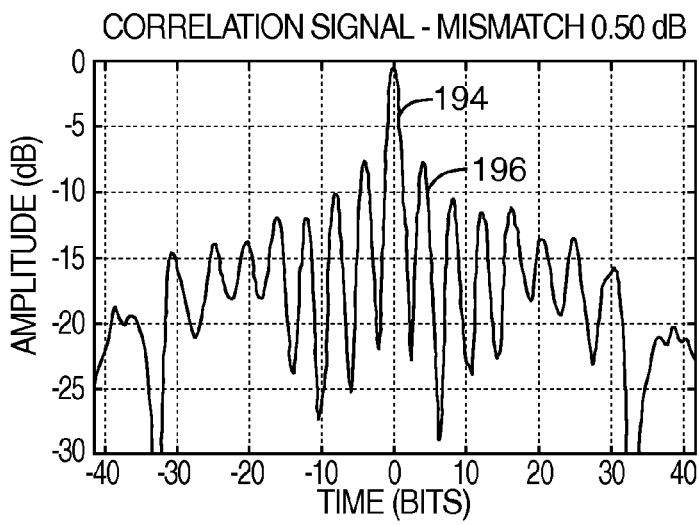

FIG. 9b shows the correlation signal that results from correlating a signal with another signal that is not an exact replica such that there is a minimum 0.5 dB mismatch loss between their waveforms. It can be seen that the sidelobes 196 are approximately 7 dB below the main peak 194, which is lower than the sidelobes 192 of the correlation signal with 0 dB mismatch in FIG. 9a. It is clear that the sidelobes 196 are presumably less likely to be confused as other candidate AIS message signals when scanning the correlation signal of FIG. 9b for correlation peaks.

Figure 9C:
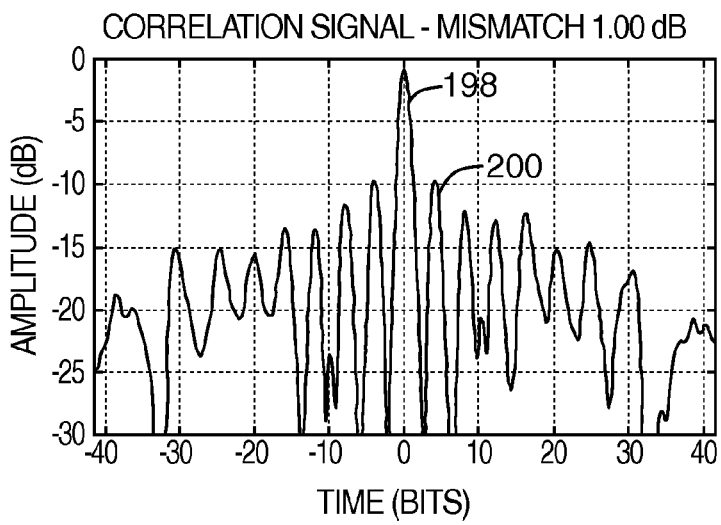

FIG. 9c shows the correlation signal that results from correlating a signal with another signal that is not an exact replica such that there is a minimum 1 dB mismatch loss between their waveforms. It can be seen that the sidelobes 200 are approximately 10 dB below the correlation peak 198, which is lower than the sidelobes 192 of the correlation signal with 0 dB mismatch shown in FIG. 9a. It is clear that the sidelobes 200 are presumably even less likely to be confused as other candidate AIS message signals when scanning the correlation signal of FIG. 9c for correlation peaks.

However, mismatch loss is undesirable because it reduces the margin between the correlation peak and any spurious peaks that may occur, thereby making it more difficult to detect candidate AIS message signals at step 162. On the other hand, the minimum mismatch loss should be chosen that is consistent with an acceptable sidelobe level, to avoid confusing the sidelobes as candidate AIS message signals. As shown in FIG. 9b, a 0.5 dB mismatch loss gives a reduction in sidelobe level of approximately 7 dB with respect to the correlation peak. This is lower than the typical spurious peak or sidelobe levels that are encountered when computing the correlation of a received AIS signal with a predefined signal. Accordingly, a 0.5 dB mismatch is a reasonable practical choice, though the precise value is not too critical, and the processing at step 160 can be configured for a mismatch of 0.5 dB. Sidelobe level and mismatch loss can always be traded off against one another, but the precise choice of mismatch is dependent on the particular waveform. If the fixed code sequence within the AIS signals that is used for the correlator is changed, then a different choice of mismatch loss will in general be appropriate.

As explained above, performing the correlation as described herein is an effective way to discriminate between overlapping signals with different Doppler offsets. This is due to the fact that a correlation peak in a correlation signal will be greatly reduced, or even removed completely, if the two signals being correlated are at different Doppler offsets whereas if a correlation peak occurs in a correlation signal then it is likely that the two signals have similar Doppler offsets. For example, assume the digital input data segment being processed contains two overlapping AIS signals with different Doppler offsets. If a predefined signal has a similar Doppler offset to one of the AIS signals, then the correlation signal generated for this digital input data segment will generally contain a correlation peak that is much larger for the AIS signal having a similar Doppler offset compared to the other AIS signal. This is illustrated in FIGS. 10a-10c.

Figure 10A:
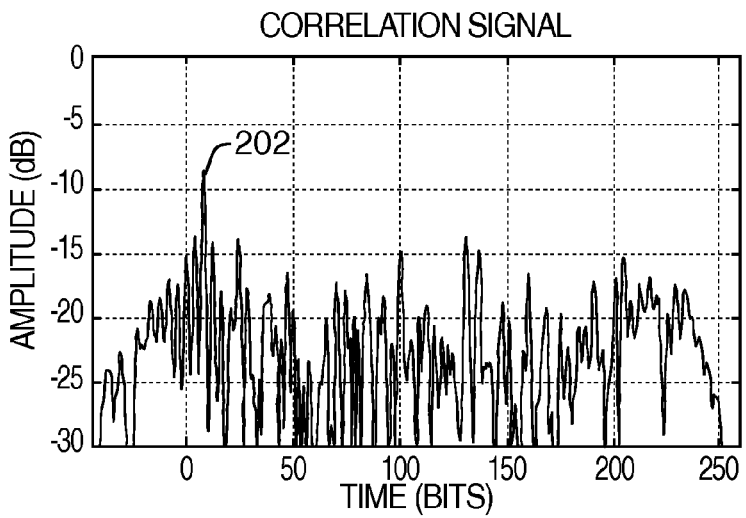
FIGS. 10A, 10B and 10C are graphical illustrations of correlation signals.

FIG. 10a shows the correlation signal that results from correlating a simulated AIS signal with a signal generated using a known 40-bit AIS code sequence, which includes a training sequence (24 bits), a start flag (8 bits), and the first byte of the message sequence (8 bits), with a 0.5 dB mismatch loss. Referring to FIG. 5, it can be seen that an AIS message signal starts with an 8-bit Ramp Up field 122 of eight zeros, which precedes the 40-bit AIS code sequence used to generate the correlation signal. Accordingly, as shown in FIG. 10a, the correlation peak 202 occurs at bit 8, when the 40-bit AIS code sequence begins. FIG. 10a illustrates that the correlation peak 202 has a significant amplitude margin over any sidelobes or other spurious peaks; this is partially due to the allowed mismatch of 0.5 dB.

Figure 10B:
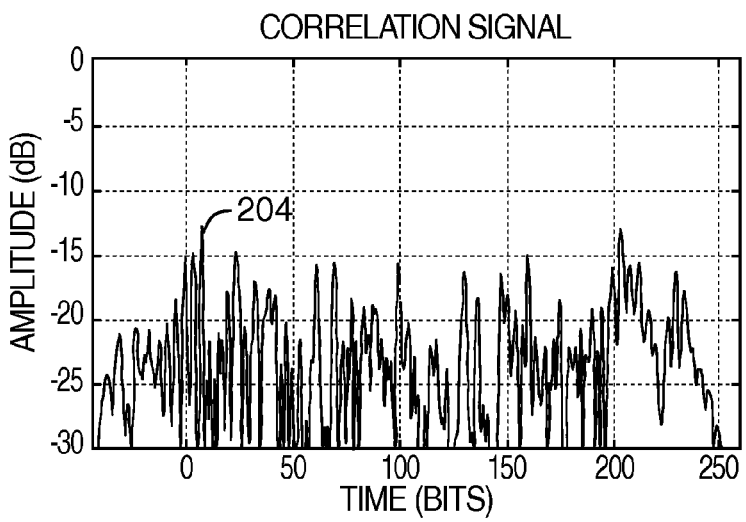

FIG. 10b shows the correlation signal computed by correlating a simulated AIS signal with the same pre-defined signal used in FIG. 10a, except that the pre-defined signal has been given a Doppler offset of 100 Hz. Comparing the correlation peak 202 of FIG. 10a with the correlation peak 204 in FIG. 10b, it can be seen that the Doppler offset of 100 Hz has reduced the correlation peak 204 by approximately 4 dB.

Figure 10C:
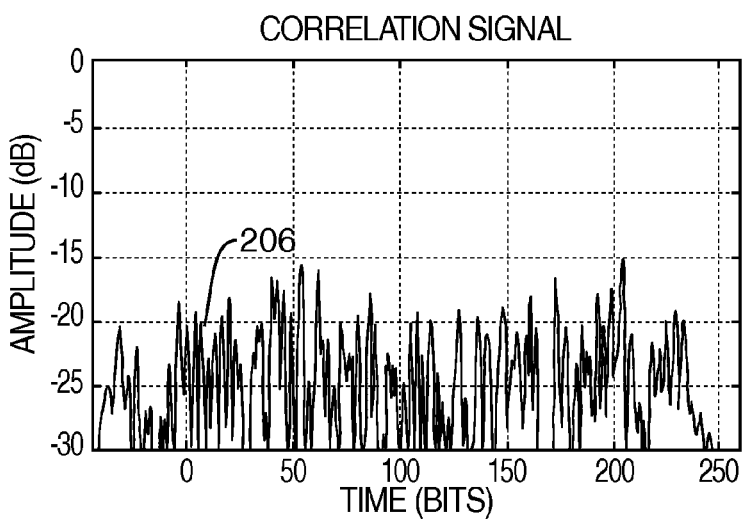

FIG. 10c shows the correlation signal that results from correlating a simulated AIS signal with the same pre-defined signal that was used in FIG. 10a, except that the pre-defined signal has been given a Doppler offset of 200 Hz. Comparing the correlation peak 202 of FIG. 10a with the correlation peak 206 of FIG. 10c, it can be seen that the Doppler offset of 200 Hz has greatly reduced the correlation peak 206 such that the peak 206 is essentially obscured by noise and not detectable.

Accordingly, at step 162 when the correlation signals are scanned for peaks, if the located peaks have amplitudes that exceed those of any subsequent peaks that lie in the same signal length (in this case 26.67 ms for example) by a certain amount, such as about 4 dB as explained previously for this example, a candidate AIS message has been detected, and the Doppler offset of the predefined signal provides an estimate of the Doppler offset of the candidate AIS message and time of the located peak provides a time estimate for the candidate AIS message.

To further illustrate this point, the effects of Doppler offset on the correlation peak can be roughly explained as follows. Considering the zero mismatch case for simplicity, from equation (7) the magnitude of a correlation peak is given by:

$$\int_{-\infty}^{\infty} |s(\tau)|^2 d\tau = \int_{-T/2}^{T/2} |s(\tau)|^2 d\tau \tag{8}$$

where T is the duration of the signal (40 bits or 40/9600=4.167 ms in this example). To a first order, the Doppler shift will modify the correlation peak magnitude to:

$$\int_{-T/2}^{T/2} s(\tau)s^*(\tau)\exp(j\omega_D\tau)d\tau \tag{9}$$

where $\omega_D$ is the Doppler shift, giving a mismatch of:

$$M = 20\log_{10}\left[\frac{\left|\int_{-T/2}^{T/2} s(\tau)s^*(\tau)\exp(j\omega_D\tau)d\tau\right|}{\int_{-T/2}^{T/2} s(\tau)s^*(\tau)d\tau}\right] dB \tag{10}$$

As an AIS signal is transmitted using GMSK modulation, which is a form of phase modulation, the signal has constant amplitude and equation (10) simplifies to:

$$\begin{aligned}M &= 20\log_{10}\left[\frac{1}{T}\left|\int_{-T/2}^{T/2} \exp(j\omega_D\tau)d\tau\right|\right] \\ &= 20\log_{10}\left[\frac{\sin(\omega_D T/2)}{\omega_D T/2}\right] \\ &= 20\log_{10}\left[\frac{\sin(\pi f_D T)}{\pi f_D T}\right] dB\end{aligned} \tag{11}$$

As a simplified example, assume the pre-defined signal is generated using a 40 bit sequence and a 100 Hz Doppler shift, with $f_D T=100\times 40/9600=0.4167$, then equation (11) gives a mismatch of 2.64 dB. The mismatch estimate in equation (11) is generally only strictly valid for a perfectly matched filter, but it is still approximately correct for the mismatched filters that are used in practice.

Equation (11) can be used to select the Doppler offsets for the pre-defined signals required in the processing step 160. In some embodiments, an additional mismatch of 0.5 dB will be acceptable, and equation (11) then implies that $|f_D T|<0.186$. For a 40-bit correlation sequence, this implies that $|f_D|<44.6$ Hz. Therefore, if the pre-defined Doppler offsets lie on a uniformly spaced frequency grid with a spacing of less than 89.2 Hz, then the greatest possible mismatch with an actual signal will be less then 0.5 dB. If this is combined with the 0.5 dB mismatch typically allowed to reduce sidelobe levels, then the maximum overall mismatch is 1 dB, which is a reasonable figure.

In a further alternative embodiment, multiple predetermined AIS code sequences may be used to compute the pre-defined signals used in the processing step 102. In this case, a generalized correlation function may be defined using a weighted linear combination of the individual correlation functions ($w_i>0$):

$$c(t) = \sum_{i=1}^{N} w_i \int_{-\infty}^{\infty} r_i(\tau)s_i^*(\tau-t)d\tau \tag{12}$$

Since:

$$\left|\sum_{i=1}^{N} w_i \int_{-\infty}^{\infty} r_i(\tau) s_i^*(\tau - t) d\tau\right| \leq \sum_{i=1}^{N} w_i \left|\int_{-\infty}^{\infty} r_i(\tau) s_i^*(\tau - t) d\tau\right| \leq \quad (13)$$

$$\sum_{i=1}^{N} w_i \left(\int_{-\infty}^{\infty} |r_i(\tau)|^2 d\tau\right)^{1/2} \left(\int_{-\infty}^{\infty} |s_i(\tau)|^2 d\tau\right)^{1/2}$$

where equality holds at t=0 if $r_i=s_i$, then a mismatch loss may be defined by:

$$L = 20\log_{10}\left(\frac{\left|\sum_{i=1}^{N} w_i \int_{-\infty}^{\infty} r_i(\tau) s_i^*(\tau) d\tau\right|}{\sum_{i=1}^{N} w_i (\int_{-\infty}^{\infty} |r_i(\tau)|^2 d\tau)^{1/2} (\int_{-\infty}^{\infty} |s_i(\tau)|^2 d\tau)^{1/2}}\right) dB \quad (14)$$

where it is assumed that the minimum loss occurs at t=0.

As before, a zero mismatch is achieved if $r_i=s_i$ for all i, but as explained above the $r_i$ can be designed to allow a slight mismatch (around 0.5 dB for example) so as to reduce the sidelobe level in the generalized correlation function of equation (12). In general, the longer the pre-defined code sequence that is used, the better the overall performance will be. In such an embodiment, the processing module 60 can be configured to generate the predefined signals employed in the correlation using a plurality of predetermined AIS code sequences. In the above equations (12) to (14), N is the number of code sequences, $r_i(t)$ is the first complex signal for the $i^{th}$ code sequence, $s_i(t)$ is the second complex signal for the $i^{th}$ code sequence and c(t) is the generalized correlation function. Furthermore, there is no precise rule for selecting the predetermined code sequences, and the choice may vary from case to case. Such predetermined code sequences must however comprise code segments that are always fixed, or are at least fixed for the great majority of cases, within the set of target signals.

Figure 8:
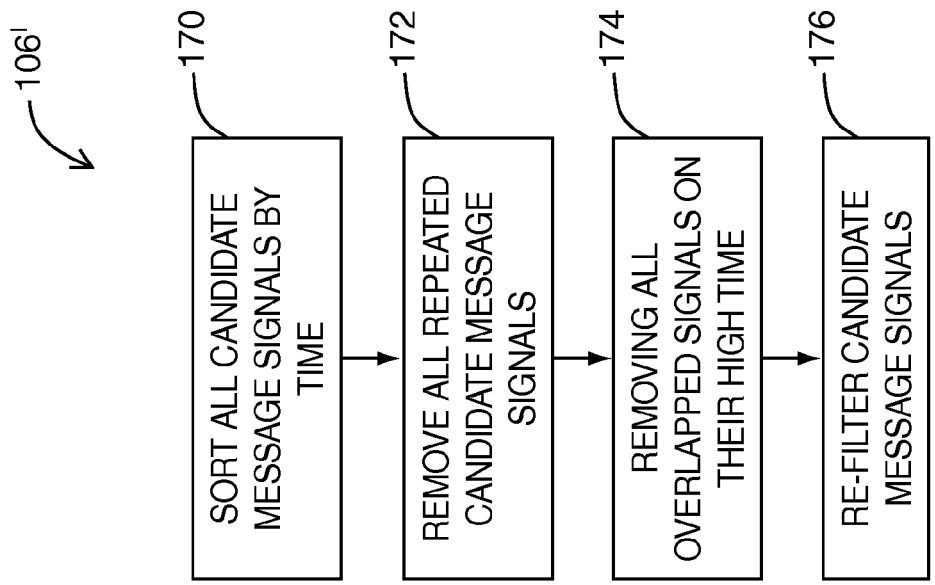
FIG. 8 is a flowchart diagram of an exemplary embodiment of a method for refining candidate message signals.

Referring now to FIG. 8, shown therein is a flowchart diagram of an exemplary embodiment 106' of the refining step 106. At step 170, all detected candidate AIS message signals (for all Doppler shifts) are sorted in order of ascending time. At step 172, all repeated candidate AIS message signals where the same message has been detected at more than one Doppler offset are removed. At step 174, messages are removed that are overlapped in both polarizations by stronger signals on their high time side, to obtain a refined group of candidate message signals. The term "high time side" refers to a given signal being overlapped by one or more signals whose correlation peaks occur at a later time than that of the given signal.

After obtaining a refined group of candidate message signals, optionally at step 176, narrowband filtering can be applied to the refined group of candidate message signals centered on the known Doppler offset frequency estimate. The bandwidth of this filter is typically 10 kHz. The narrowband filtering blocks as much spectral energy as possible from overlapping signals with different Doppler offsets, and improves the probability of successful decoding.

For simplicity, the embodiments described herein have primarily been described in relation to systems and methods with one LEO satellite and one ground station. However, as noted above, systems and methods employing multiple LEO satellites and/or one or more ground stations are possible, raising new AIS signal detection and decoding possibilities. With multiple LEO satellites, AIS signals from a given ship may be received by more than one LEO satellite. Correlation techniques using the data from the multiple LEO satellites can then be used. AIS signals received from ground stations can also be employed. For example, embodiments may be configured to de-correlate AIS signals transmitted by ships that are within the FOV of a ground station from the digital input data produced by an LEO satellite. This de-correlation removes the already detected AIS signals from the digital input data, and in effect, primarily only the AIS signals sent by ships outside of the FOV of the ground station remain in the digital input data for further processing, which limits AIS signal detection and decoding to those ships outside the FOV of the ground stations. Further, it should be noted that there can be embodiments in which the steps shown in at least one of FIGS. 7 and 8 are combined with the steps shown in FIG. 4 or 6.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

For instance in an alternative embodiment, additional antennas and receiver channels can be used to provide additional directional information, which can aid in discriminating between AIS signals from different regions. If additional spatially separated antennas of any polarization are used, then all of the antennas receive signals of similar strength but with different phases. By combining these signals with appropriate phase combinations, it is possible to discriminate in favour of some spatial directions and against others. This is similar to the concept of a phased array antenna, where directivity is achieved by having numerous radiating elements fed by an appropriate combination of phase shifters. The required hardware is a generalization of the embodiment described herein for the two-antenna arrangement, in which each antenna has its own RF chain. In this case, the signal processing involves combining the antenna outputs in various phase combinations in a similar fashion as described for the two-antenna embodiment described herein. In cases in which sufficient spatial separation of the antennas is not achieved on a single LEO satellite, a cluster of LEO satellites can be used to utilize this feature of spatial differentiation of AIS signals received in space. In effect, this can be thought of as increasing the effective antenna size to enhance directivity. This hardware and processing structure can be generalized to any number of antennas that can be differentiated spatially or by using polarization or by using both of these characteristics. As long as independent information is available from each antenna then combining the antenna outputs in different phase combinations provides a mechanism for discriminating between AIS signals coming from different directions.

The invention claimed is:

1. A method for producing validated decoded Automatic Identification System (AIS) message segments from a plurality of AIS signals wherein a plurality of AIS signals are received at one or more satellites in space and pre-processed to produce digital input data corresponding to the received plurality of AIS signals, the method comprising:

processing the digital input data by correlating the digital input data with a plurality of predefined signals having different Doppler offsets to compute a plurality of corresponding correlation signals, wherein the plurality of predefined signals are generated by applying the different Doppler offsets to a predetermined AIS code sequence, and scanning the plurality of correlation signals for amplitude peaks exceeding neighbouring amplitude peaks by a predetermined amount in order to identify one or more candidate AIS message signals;

determining corresponding Doppler offset estimates and arrival time estimates for the one or more candidate AIS message signals;

decoding the one or more candidate AIS message signals in the digital input data to obtain corresponding message segments; and validating the decoded message segments for proper AIS formatting to produce validated decoded AIS message segments.

2. The method of claim 1, wherein prior to decoding the one or more candidate AIS message signals, the method further comprises refining the group of one or more candidate AIS message signals to obtain a refined group of candidate AIS message signals and performing the decoding on the refined group of candidate AIS message signals, wherein refining the candidate message signals comprises:

determining whether any of the one or more candidate AIS message signals is repeated at a different Doppler offset estimate; and removing all repeated candidate AIS message signals.

3. The method of claim 1, wherein prior to decoding the one or more candidate AIS message signals, the method further comprises refining the group of one or more candidate AIS message signals to obtain a refined group of candidate AIS message signals and performing the decoding on the refined group of candidate AIS message signals, wherein refining the candidate message signals comprises:

sorting the one or more candidate AIS message signals by their corresponding arrival time estimates; and removing all remaining candidate AIS message signals that are overlapped on their high time side by a stronger candidate AIS message signal.

4. The method of claim 1, wherein before decoding the method further comprises filtering the one or more candidate AIS message signals by applying narrowband filtering centered on the Doppler offset estimate that corresponds to the one or more candidate AIS message signals.

5. The method of claim 1, wherein the method further comprises employing at least two antennas configured to receive the plurality of AIS signals, the at least two antennas being differentiated from one another in at least one of a spatial and a polarization manner, and before the decoding step the method further comprises combining the one or more candidate AIS message signals received by one of the at least two antennas with corresponding one or more candidate AIS message signals received by at least one of the other antennas by employing a phase-shift that maximizes the amplitude of the combined one or more candidate AIS message signals relative to any overlapping signals, and performing decoding on the combined one or more candidate AIS message signals.

6. The method of claim 1, wherein the method further comprises de-correlating the validated decoded message segments to obtain modified digital input data, and performing the processing, determining and decoding steps on the modified digital input data.

7. The method of claim 1, wherein prior to decoding the method comprises determining a more precise Doppler offset estimate and arrival time estimate for the one or more candidate message signals.

8. The method of claim 7, wherein the method further comprises employing a Viterbi decoder configured to decode GMSK modulated signals in the decoding step.

9. The method of claim 1, wherein at least one decoded message segment is associated with a given ship, and after decoding the method returns to the processing step which further comprises:

correlating the digital input data with a plurality of predefined signals that correspond to a subsequence of the at least one decoded message segment associated with the given ship; and determining whether the digital input data is a candidate AIS message signal associated with the given ship.

10. A system for producing validated decoded Automatic Identification System (AIS) message segments from a plurality of AIS signals wherein a plurality of AIS signals are received at one or more satellites in space and pre-processed to produce digital input data corresponding to the received plurality of AIS signals, the system comprising:

a processing module configured to process the digital input data by correlating the digital input data with a plurality of predefined signals having different Doppler offsets to compute a plurality of corresponding correlation signals, wherein the plurality of predefined signals are generated by applying the different Doppler offsets to a predetermined AIS code sequence, scan the plurality of correlation signals for amplitude peaks exceeding neighbouring amplitude peaks by a predetermined amount in order to identify the one or more candidate AIS message signals, and determine corresponding Doppler offset estimates and arrival time estimates for one or more candidate AIS message signals;

a decoder configured to decode the one or more candidate AIS message signals in the digital input data to obtain corresponding message segments; and a validation module configured to validate the decoded message segments for proper AIS formatting to produce validated decoded AIS message segments.

11. The system of claim 10, wherein the system further comprises a refining module configured to refine the one or more candidate AIS message signals to obtain a refined group of candidate AIS message signals and wherein the decoder module is configured to perform decoding on the refined group of candidate AIS message signals, and wherein the refining module is configured to refine the one or more candidate AIS message signals by determining whether any of the one or more candidate AIS message signals is repeated at a different Doppler offset estimate; and removing all repeated candidate AIS message signals.

12. The system of claim 10, wherein the system further comprises a refining module configured to refine the one or more candidate AIS message signals to obtain a refined group of candidate AIS message signals and wherein the decoder module is configured to perform decoding on the refined group of candidate AIS message signals, and wherein the refining module is configured to refine the one or more candidate AIS message signals by sorting the one or more candidate AIS message signals by their corresponding arrival time estimate; and removing all remaining candidate AIS message signals that are overlapped on their high time side by a stronger candidate AIS message.

13. The system of claim 10, wherein the processing module is further configured to filter the one or more candidate AIS message signals by applying narrowband filtering centered on the Doppler offset estimate that corresponds to the one or more candidate AIS message signals.

14. The system of claim 10, wherein the system further comprises at least two antennas configured to receive the plurality of AIS signals, the at least two antennas being differentiated from one another in at least one of a spatial and a polarization manner, and wherein the processing module is further configured to combine the one or more candidate AIS message signals received by one of the at least two antennas with corresponding one or more candidate AIS message signals received by at least one of the other antennas by employing a phase-shift that maximizes the amplitude of the combined one or more candidate AIS message signals relative to any overlapping signals, and wherein the decoder is configured to perform decoding on the combined one or more candidate AIS message signals.

15. The system of claim 10, wherein the system is further configured to de-correlate the validated decoded message segments to obtain modified digital input data, and wherein the processing module is further adapted to process the modified digital input data.

16. The system of claim 10, wherein the processing module is further configured to determine a more precise Doppler offset estimate and arrival time estimate for the one or more candidate AIS message signals prior to decoding.

17. The system of claim 16, wherein the decoder comprises a Viterbi decoder configured to decode GMSK modulated signals.

18. The system of claim 10, wherein the system is further configured to associate at least one decoded message with a given ship, correlate the digital input data with a plurality of predefined signals that correspond to a subsequence of the at least one decoded message associated with the given ship and determine whether the digital input data is a candidate signal message associated with the ship.

* * * * *